United States Patent
Neculescu et al.

(10) Patent No.: US 6,719,943 B1
(45) Date of Patent: *Apr. 13, 2004

(54) PROCESS FOR THE MANUFACTURE OF DISPOSABLE FOOD CONTACT COMPATIBLE MICROWAVEABLE CONTAINERS HAVING AT LEAST ONE MICRONODULAR SURFACE

(75) Inventors: Cristian M. Neculescu, Neenah, WI (US); Richard J. Rogers, Neenah, WI (US); Mark B. Littlejohn, Appleton, WI (US); Anthony J. Swiontek, Neenah, WI (US)

(73) Assignee: Fort James Corporation, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/572,967

(22) Filed: May 18, 2000

Related U.S. Application Data

(60) Division of application No. 08/947,025, filed on Oct. 8, 1997, now Pat. No. 6,120,863, which is a continuation-in-part of application No. 08/733,463, filed on Oct. 18, 1996, now abandoned.

(51) Int. Cl.⁷ .......................... B29C 51/10; B29C 47/92
(52) U.S. Cl. .................. 264/553; 264/210.1; 264/211; 264/211.12
(58) Field of Search ................ 264/553, 175, 264/176.1, 210.2, 211.12, 211

(56) References Cited

U.S. PATENT DOCUMENTS 3,893,795 A * 7/1975 Nauta .......................... 425/403

4,311,658 A * 1/1982 Nicoll ......................... 264/175
4,696,857 A   9/1987 Sibilia et al.
4,734,450 A   3/1988 Kawai et al.

(List continued on next page.)

FOREIGN PATENT DOCUMENTS

| EP | 0219198 | 1/1986 |
| EP | 0407198 | 5/1990 |
| JP | 53 84044 | 11/1976 |
| JP | 53 084044 | 7/1978 |
| JP | 59 209520 | 11/1984 |
| JP | 03 173626 | 7/1991 |
| JP | 59 209520 | 11/1994 |

*Primary Examiner*—Mark Eashoo
(74) *Attorney, Agent, or Firm*—Finnegan, Henderson, Farabow, Garrett & Dunner LLP

(57) ABSTRACT

Disposable food contact compatible microwaveable containers having one or more micronodular surface are disclosed. These containers, including plates, bowls, cups, trays, buckets, soufflé dishes, and lids are prepared from a polyolefin selected from the group consisting of polypropylene, polypropylene polyethylene copolymer or blends, and mixtures of these, mica, and pigment and are thermoformed into the shape of a the aforementioned containers exhibiting (a) a micronodular surface on at least one side of the surface; (b) a melting point of not less than about 250° F.; said containers being dimensionally stable and resistant to grease, sugar, and water at temperatures up to at least 250° F. and being of sufficient toughness to resist cutting by serrated polystyrene flatware.

21 Claims, 21 Drawing Sheets

U.S. PATENT DOCUMENTS

| | | | |
|---|---|---|---|
| 4,809,876 A | | 3/1989 | Tomaswick et al. |
| 4,929,474 A | * | 5/1990 | Avni et al. .................. 427/326 |
| 4,933,526 A | | 6/1990 | Fisher et al. |
| 4,981,631 A | | 1/1991 | Cheung et al. |
| 5,023,286 A | | 6/1991 | Abe et al. |
| 5,045,369 A | | 9/1991 | Kobayashi et al. |
| 5,156,790 A | * | 10/1992 | Cucchisi et al. ......... 264/176.1 |
| 5,219,627 A | * | 6/1993 | Arase et al. ................ 428/35.7 |
| 5,223,194 A | * | 6/1993 | Rosen ...................... 264/46.1 |
| 5,300,747 A | | 4/1994 | Simon |
| 5,326,020 A | | 7/1994 | Cheshire et al. |
| 5,377,860 A | | 1/1995 | Littlejohn et al. |
| 5,423,160 A | | 6/1995 | Rosen |
| 5,439,628 A | | 8/1995 | Huang |
| 5,582,670 A | * | 12/1996 | Andersen et al. ........... 156/242 |
| 5,622,780 A | | 4/1997 | Paleari |
| 5,665,442 A | | 9/1997 | Andersen et al. |
| 5,750,226 A | | 5/1998 | Macauley et al. |
| 5,766,712 A | | 6/1998 | Darr et al. |
| 5,843,260 A | * | 12/1998 | Huskey ...................... 156/153 |
| 5,968,431 A | * | 10/1999 | Ang et al. ............. 264/171.26 |
| 6,024,907 A | * | 2/2000 | Jagunich ...................... 264/284 |
| 6,340,530 B1 | * | 1/2002 | Porter et al. ............. 428/474.4 |
| 6,403,936 B2 | * | 6/2002 | Cochran et al. ............ 219/633 |

\* cited by examiner

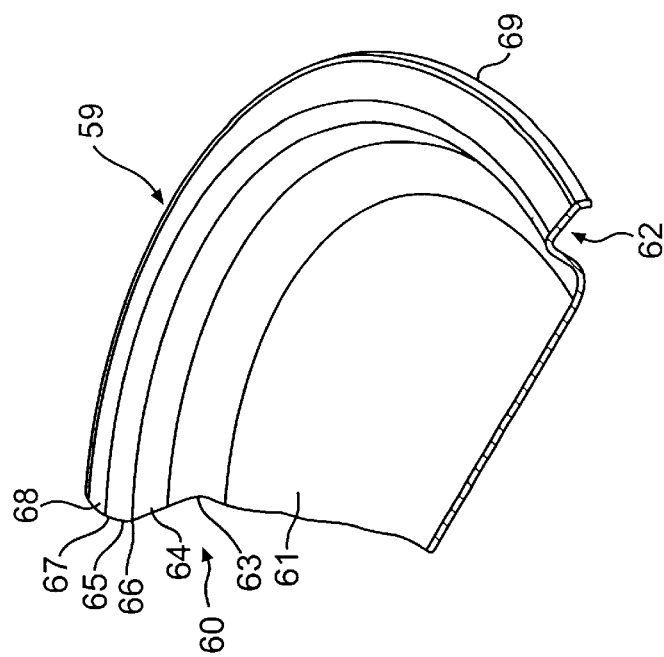
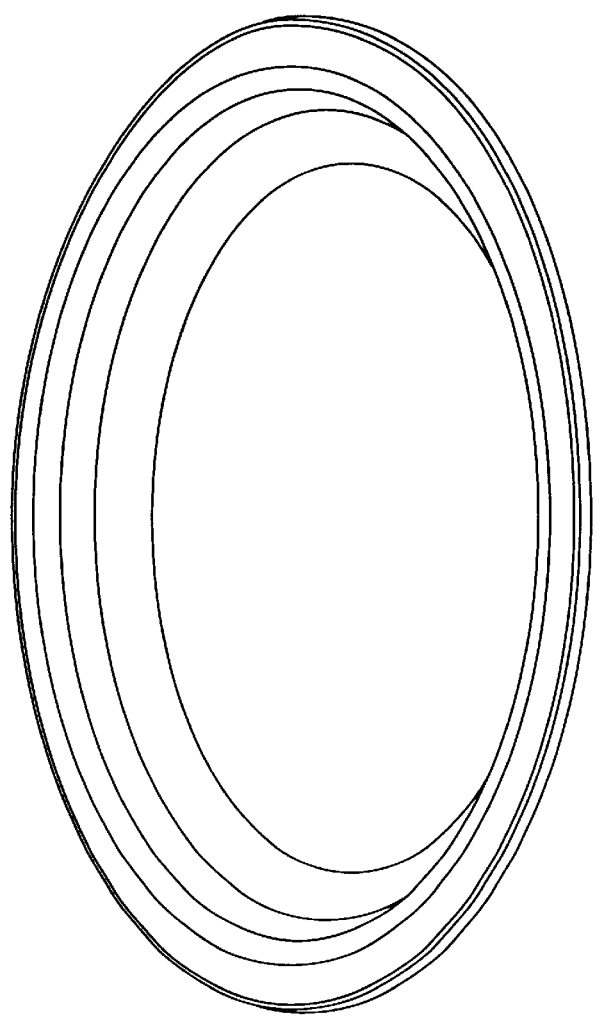
FIG. 5B
FIG. 5A

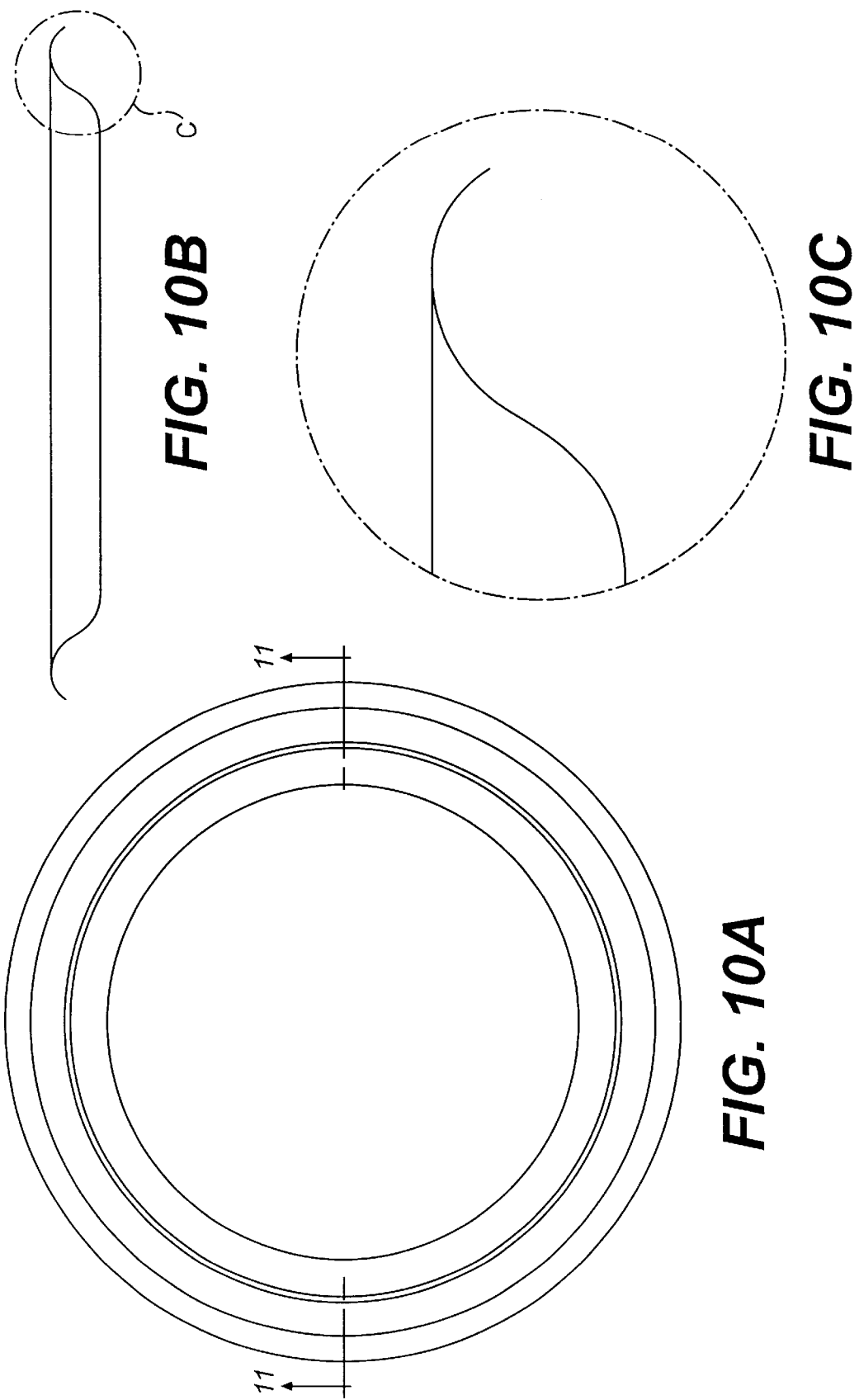

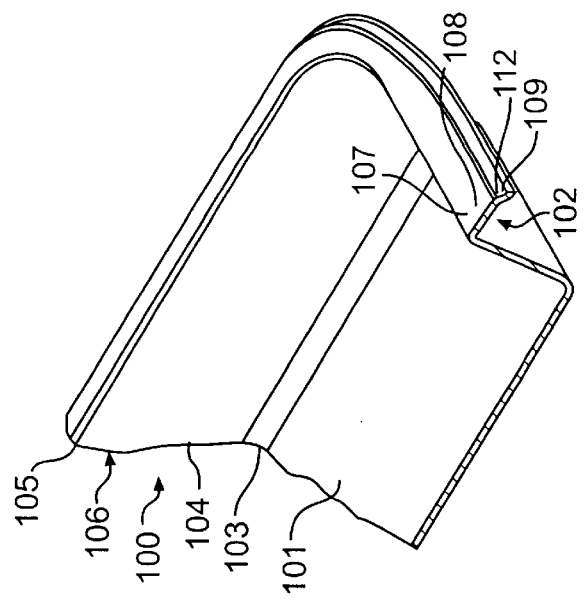
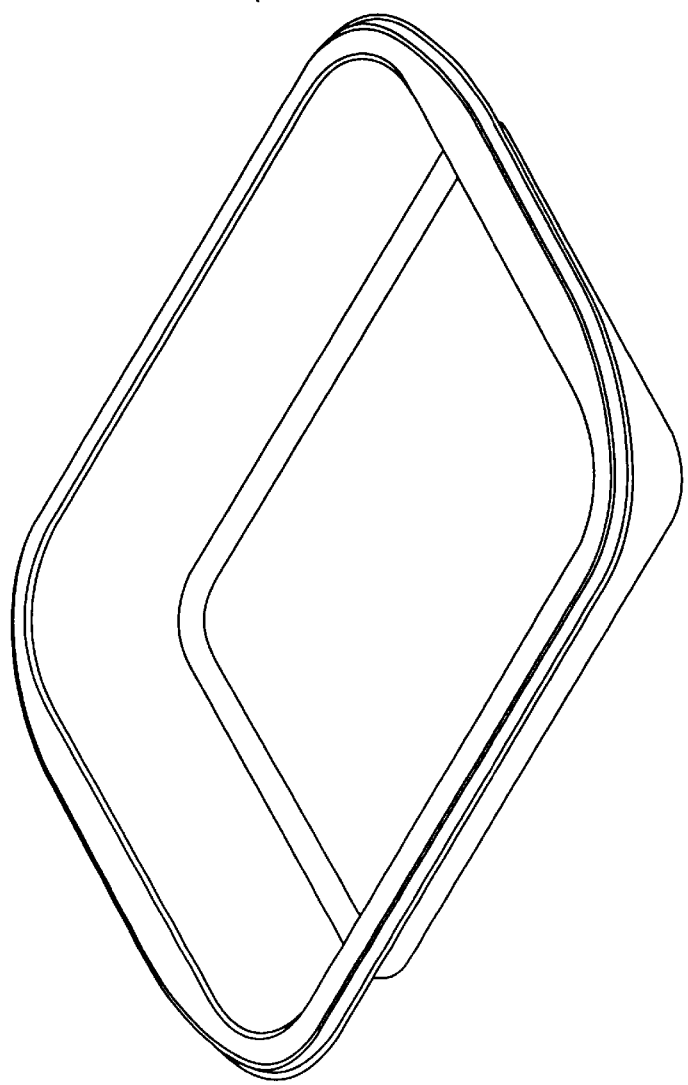
FIG. 13B
FIG. 13A

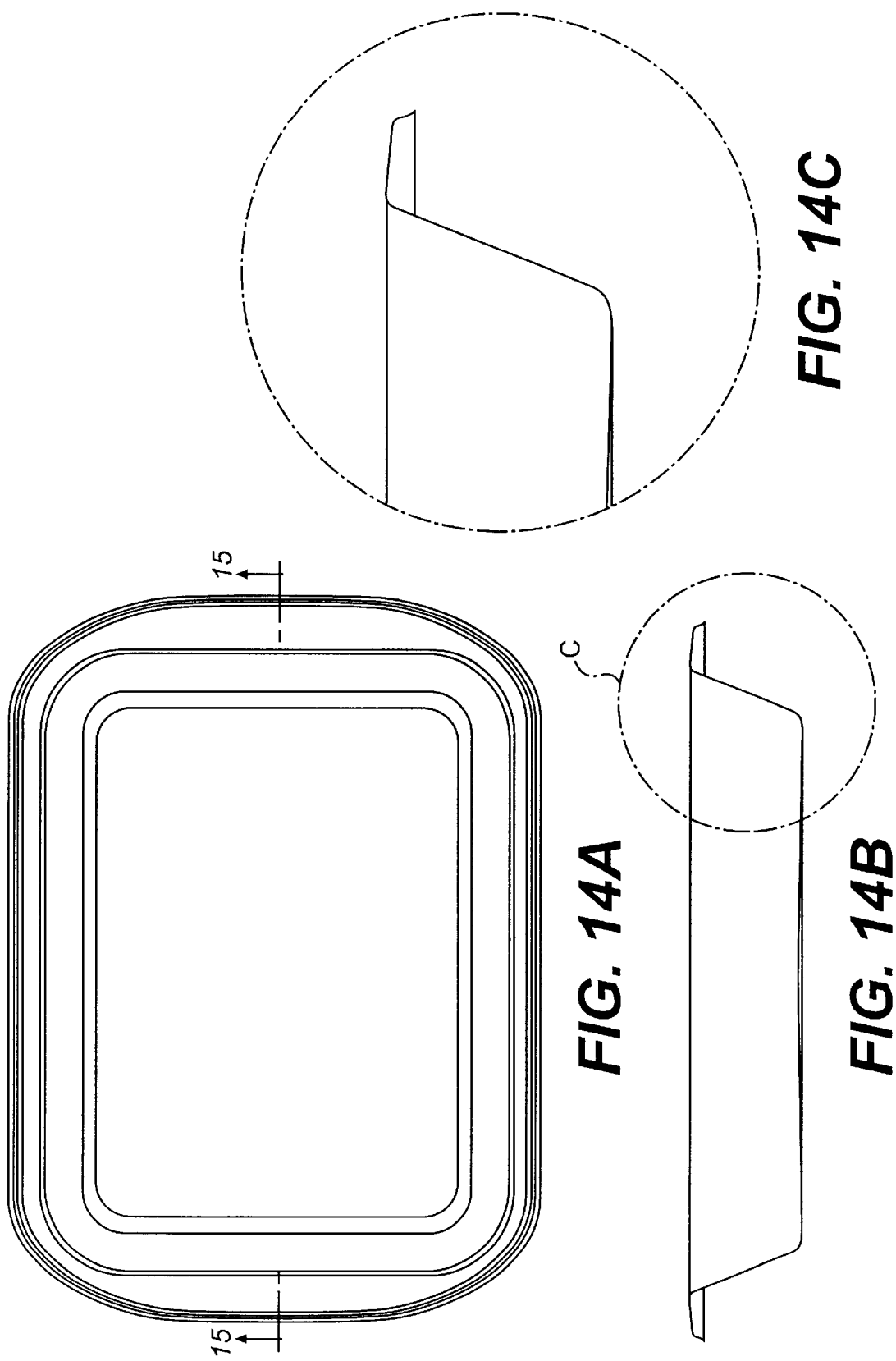

EXTRUDED PP/30% MICA SHEET SURFACES (A)-MATTE SIDE AND (B)-SIDE OPPOSITE TO MATTE SIDE

EXTRUDED PP/30% MICA SHEET SURFACES (A)-MATTE SIDE AND (B)-SIDE OPPOSITE TO MATTE SIDE

EXTRUDED PP/30% MICA NON-MATTE
SHEETSURFACES (G) AND (H)

EXTRUDED PP/30% MICA NON-MATTE
SHEETSURFACES (G) AND (H)

PROCESS FOR THE MANUFACTURE OF DISPOSABLE FOOD CONTACT COMPATIBLE MICROWAVEABLE CONTAINERS HAVING AT LEAST ONE MICRONODULAR SURFACE

RELATED APPLICATIONS

This is a division of application Ser. No. 08/947,025, filed Oct. 8, 1997, now U.S. Pat. No. 6,120,863, which is a continuation-in-part of application Ser. No. 08/733,463, filed Oct. 18, 1996, now abandoned, which is incorporated herein by reference.

This application is a continuation-in-part application of Ser. No. 08/733,463 filed on Oct. 18, 1996.

BACKGROUND OF THE INVENTION

This invention relates to disposable food contact compatible microwaveable containers having at least one micronodular surface including cups, trays, soufflé dishes, lids, plates, bowls, and related articles of manufacture useful for preparation, storage, delivery, and serving of food, wherein convenience and low cost are of paramount importance. Nevertheless, appearance and tactile characteristics of the plate, container, etc., are important for consumer preference. The suitability of these disposable articles of manufacture for microwave cooking, or heating of food, has an important place in today's marketplace. Both the commercial and retail market components need an aesthetically pleasing microwaveable, disposable, rigid and strong container, plate, or cup, and related article of manufacture. This invention is directed to economically meeting that need and provides a container or plate comprising an extruded sheet of a polyolefin selected from the group consisting of polypropylene, polypropylene polyethylene copolymer or blend, or a mixture of these coupled with mica or a similar platy inorganic mineral.

These disposable microwaveable containers and plates exhibit (a) a micronodular surface on the food contact side of the plate or container, and (b) a melting point of no less than about 250° F., said container or plate being dimensionally stable and resistant to grease, sugar, and water at temperatures up to at least 220° F. and exhibiting sufficient toughness to be resistant to cutting by serrated polystyrene flatware. Microwaveable and disposable containers and plates having all the aforementioned properties are not known in the prior art. In U.S. Pat. No. 5,377,860, assigned to assignee of the present patent application, a double shell food container is disclosed. The composition and properties of the container differ from the present invention since a polyolefin/mica composition is not suggested or disclosed and the container does not have the thermal properties or the micronodular surface of the containers disclosed herein. The containers disclosed in European Patent Application D544, 429A1 do not suggest or disclose a container which can meet the thermal properties and have the desirable micronodular surface of the container of the present invention.

SUMMARY OF THE INVENTION

Microwaveable, disposable, rigid, strong and food contact compatible containers and plates have been prepared. These disposable and microwaveable articles of manufacture exhibit (a) a micronodular surface on the side coming in contact with the food; and (b) a melting point of not less than 250° F., suitably 250° F. to 330° F. These microwaveable, food contact compatible containers and plates are dimensionally stable and resistant to grease, sugar, and water at temperatures of at least 220° F. and are of sufficient toughness to be resistant to cutting by serrated polystyrene flatware. These containers, in the form of disposable lunch (8.75 inch) and dinner plates (10.25 inch), exhibit a SSI rigidity of at least 200 grams per 0.5 inch at a basis weight of about 130 lbs. per 3000 square foot ream. At a basis weight of about 200, SSI rigidity is about 300 grams per 0.5 inches; and at a basis weight of about 360, SSI rigidity is about 700 grams. The containers and plates of this invention answer a long felt need for products which can withstand the severe conditions of a microwave oven when common foods such as beans and pork, pancakes with syrup, pepperoni pizza, and broccoli with cheese are microwaved during food cooking and reconstituting processes. When the polyolefin is combined with mica, these containers and plates exhibit a micronodular surface on one or both sides usually on the side coming in contact with the food.

As shown in Example 9 and Table 12, competing commercial polystyrene type plates cannot withstand the high temperatures generated in the microwave oven during food contact and either significantly warped or deformed when the aforementioned food products were placed on them. Under the usual microwaving conditions with high grease content foods, the prior art plates tend to deform and flow to the point where parts of the plate became adhered to the inside of the microwave oven. For disposable plates and containers, appearance and feel are important attributes. The micronodular surface of the plates and containers of this invention where mica is used in combination with polypropylene or polypropylene polyethylene copolymers or blends tend to give these products the pleasing appearance and feel of stoneware or a pottery-like look. Another significant property of the containers and plates of this invention is their cut resistance. These rigid articles of manufacture are of sufficient toughness to be resistant to cutting by serrated polystyrene flatware. In normal usage they are also resistant to cutting by regular metal flatware.

BRIEF DESCRIPTION OF THE DRAWINGS

The present invention will become more fully understood from the detailed description given herein below and the accompanying drawings, which are given by way of illustration only, and thus, are not limitative of the present invention and wherein:

FIG. 5 is a drawing of a plate of this invention.

FIG. 10 is a cross sectional view of the plate shown in FIG. 9

FIG. 13 is a drawing of a tray included in this invention.

FIG. 14 is a cross sectional view of the tray shown in FIG. 13.

DETAILED DESCRIPTION OF THE INVENTION

The aesthetically pleasing microwaveable disposable, rigid and strong containers including plates, bowls, cups, trays, buckets, souffé dishes and lids comprise isotactic polypropylene, propylene-ethylene copolymer, or blends of isotactic polypropylene and propylene-ethylene copolymer coupled with a mixture of a platy inorganic mineral such as mica. Suitably coupling agents and pigments are utilized. To form suitable containers, bowls, trays and plates having excellent thermal, mechanical, and other physical properties and also exhibiting a micronodular surface, coupling agents should be utilized in conjunction with mica. The function of the coupling agent is to promote the adherence of the polypropylene moiety to mica. In the absence of a coupling agent, mica may not adhere well to the polymer matrix and so may not be integrated into the sheet from which the containers, bowls, trays and plates are thermoformed. Maleic anhydride and acrylic modified polypropylenes are suitable coupling agents.

Figure 1:
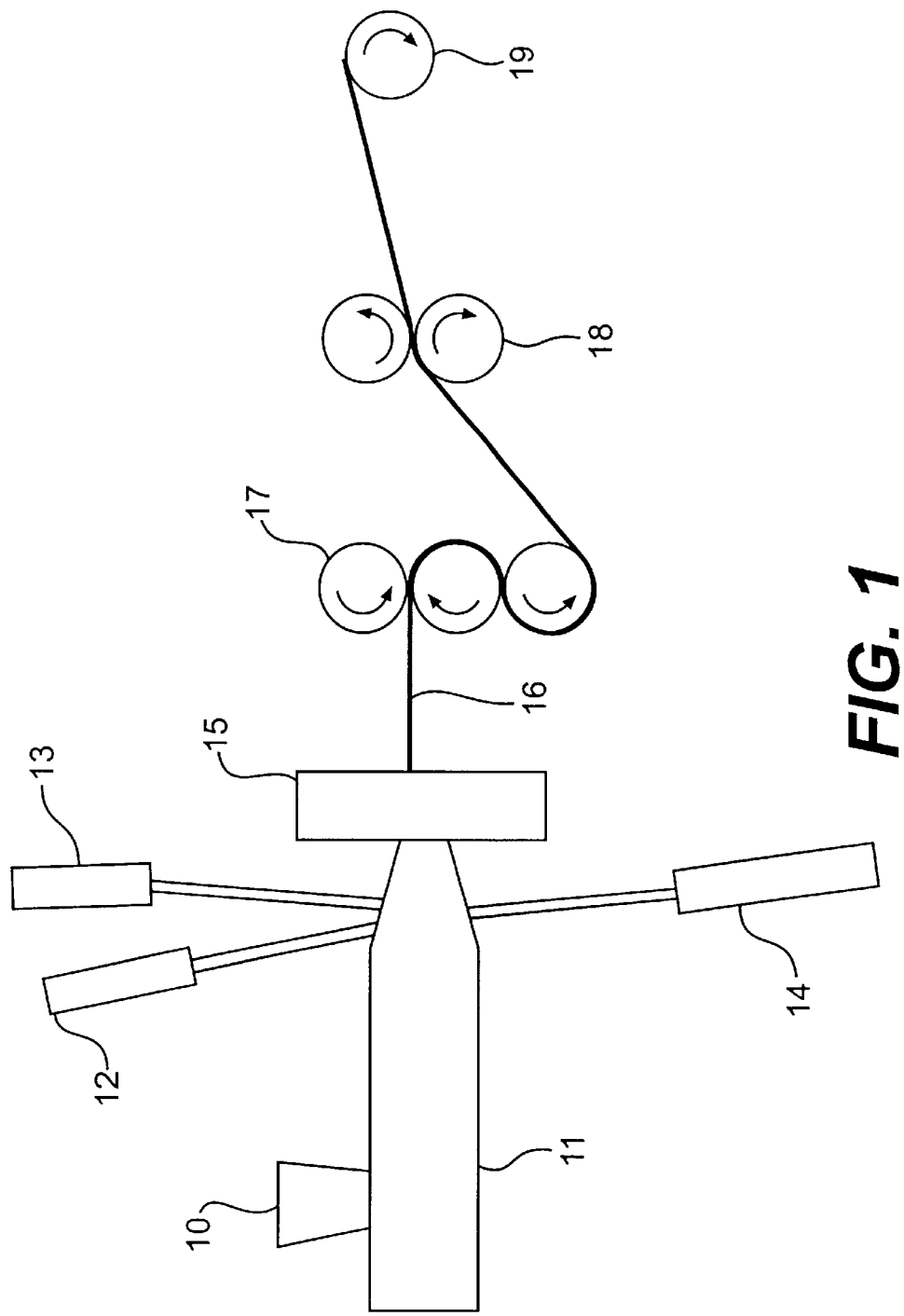
FIG. 1 is a schematic flow diagram of the sheet extrusion process.
Figure 2:
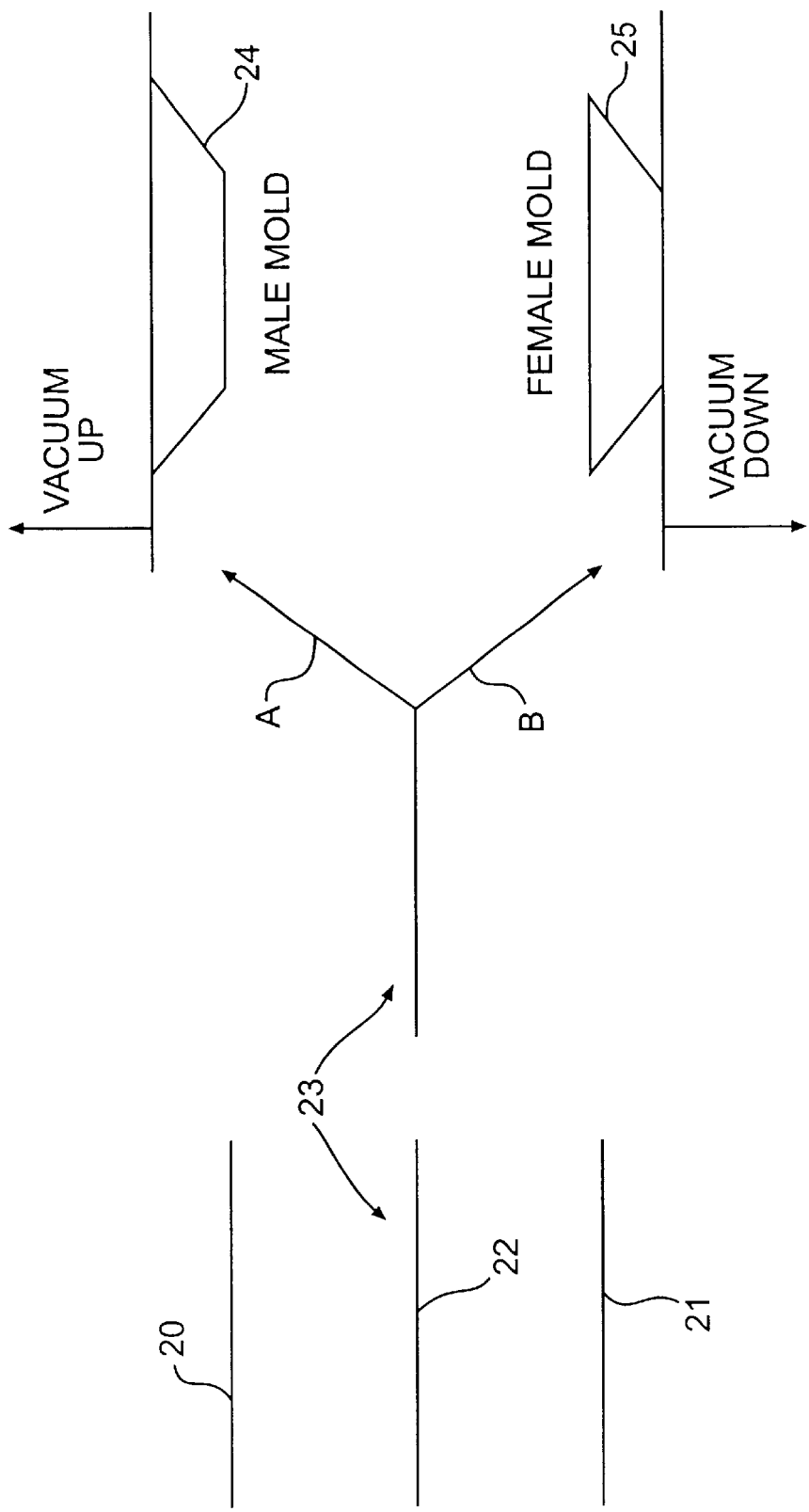
FIG. 2 is a schematic flow diagram of the thermoforming process for the manufacture of plates and containers having the micronodular surface.

The containers, bowls, trays and plates of this invention are preferably formed from a sheet which has been extruded as shown in FIG. 1 and then thermoformed as shown in FIG. 2.

Advantageously, the sheet is formed by an extrusion process utilizing the compounded polymer/mica mixtures. The final extrusion process renders a sheet with excellent thermal properties and cut resistance. Generally, injection molding is inherently not suitable for the manufacture of self-texturized micronodular containers, bowls, trays and plates since injection molded products are smooth plastic like articles which do not exhibit a micronodular surface or have a feel of stoneware or pottery-like look.

The aesthetically pleasing disposable microwaveable containers, trays, bowls and plates exhibit (a) at least one micronodular surface, this surface is usually on the food contact side of the plate or container, and (b) a mefting point of at least 250° F. In addition, the container or plate is dimensionally stable and resistant to grease, sugar, and water at temperatures of at least 220° F. and is of sufficient toughness to be resistant to cutting by serrated polystyrene flatware. The mica filled polypropylene plates also exhibit a thickness uniformity characterized by a thickness coefficient of variation of less than about five percent.

Mica is a common name for naturally occurring inert mineral of the phyllosilicate chemical family, specifically potassium aluminosilicate whereby the aluminum ions may be partially replaced by iron and magnesium and part of the chemically bound water may be substituted by fluorine.

Mica is easily cleaved into thin, relatively regular, flexible yet strong sheets (leaf-like flakes) with thickness in the range of half a micron and aspect ratio as high as 300. Mica is much softer than other inorganic fillers (calcium carbonate, wollastonite, glass) yet only slightly harder than talc. Mica has a slippery tactile feel and low abrasiveness relative to other common inorganic fillers.

The reinforcement effect at 40 weight percent mica is equivalent to that of 30 weight percent glass fiber. But hard inorganic fibrous fillers such as glass (various lengths) and wollastonite (acicular structures) have serious drawbacks such as abrasiveness and are prone to fracture degradation during conventional melt processing. Other fibrous (organic) fillers are derived from wood and vegetable sources and are not suitable for use in the manufacture of the containers of this invention since the organic fillers tend to degrade during processing and they are also moisture sensitive. In our process we prefer to use about 20 to 35 weight percent mica.

Extenders such as calcium carbonate and clay have been traditionally used in disposable plastic foodservice articles with low cost as the primary concern, i.e., these fillers are usually selected for cost reduction rather than reinforcement. For example, calcium carbonate is a cheap, hard, and abrasive filler which delivers moderately low reinforcement (even when coupled) due to its low aspect ratio and highly irregular particle structure. In the case where microwaveability is desired for the plastic disposable foodservice article, the not so perfect solution has been the use of relatively expensive high heat polystyrene based materials (e.g., unfilled PPO and SMA engineering resins), where PPO refers to polyphenylene oxide and SMA refers to styrene-maleic anhydride copolymer.

The mica filled polypropylene containers, bowls, trays and plates of this invention have overcome the disadvantages of the prior art type containers, bowls, trays and plates and are significantly superior to them.

Platy mineral filled polypropylene is compounded by pre-blending the polypropylene in pellet or flake form with mica powder and other additives (coupling agents, color concentrates, pigments, antioxidants, lubricants, nucleating agents, antistatic agents, etc.) This mixture is conveyed into the feed section addition point of a twin screw compounding extruder. Alternatively, the components are advantageously fed separately into the same or at different points of addition, using combinations of volumetric and/or gravimetric (i.e., loss in weight type) feeders.

For white pigmentation, titanium dioxide is preferred due to combination of brightness, and opacity, as well as stability during processing and final use. Surface treatment may be optionally used to further enhance wetting, dispersion, compatibility with matrix resins whereas the titanium dioxide forms may be of the rutile or anatase type. Alternate white pigments may also consist of calcined clay or blends of calcined clay with titanium dioxide. For black pigmentation, carbon black is preferred due to a combination of desirable characteristics such as blackness, and dispersibility, the latter of which can be carefully controlled by choice of particle size and surface chemistry. Carbon black is amorphous carbon in finely divided form which is made by either the incomplete combustion of natural gas (channel black) or by reduction of liquid hydrocarbons in refractory chambers (furnace black).

The twin screw extruder provides sufficient mixing action to effectively cause the wetting and dispersion of the filler into the polymer matrix. The twin screw extruder may be of the co-rotating or counter-rotating type, where each type is equipped with different screw flight elements which are appropriate for the feed, mixing, and melt metering zones. The discharge zone normally consists of a strand die where the exiting molten material strands are quenched in a circulating water bath followed by knife cutting into pellets.

Low molecular weight additives such as waxes, fluorinated polymers, and other specialty lubricants are suitably used as process aids to reduce the melt viscosity and improve throughput. Other additives may include nucleating agents and antistatic agents. Antioxidants may be added in small amounts, generally less than one weight percent, to minimize shear and thermal degradation of the polypropylene during the extrusion and forming processes as well as to promote the chemical stability of the sheet prior to and during final article use. Suitable antioxidants are advantageously selected from the group of phenolics and phosphites and blends thereof. These are produced by Ciba-Geigy and General Electric Corporation.

Coupling agents such as silanes (azido functional or amido styryl functional), organofunctional silicone compounds, chlorinated hydrocarbons with and without silane, in situ polymerization of monomers, or modified polyolefins are often used. For certain applications, the mica particle surfaces may be pretreated with the coupling agents. For the polymeric coupling agents or compatibilizers, in particular, such agents may be conveniently added directly during the formulation compounding step. Polymeric compatibilizers are preferred for ease of handling and also for the avoidance of toxic residual monomers and solvents. In particular, maleic anhydride or acrylic modified polypropylene can be used as coupling agents. They promote the adherence between the polypropylene and the mica filler and serve to minimize the embrittlement effect of the filler, and also promote toughness at ambient conditions and dimensional stability at elevated temperatures for the platy mineral filled sheets and the containers made therefrom. The use of maleic anhydride modified polypropylene, whereby the maleic anhydride is in the range of 0.5–5.0 mole percent, is preferred. The use of coupling agents promotes good interfacial bonding between the platy mineral filler and the matrix resin interface resulting in good solid state mechanical properties of the containers and plates. The coupling agents also maximize the melt strength enhancing features of the platy mica filler. Melt strength of the sheets is further improved when the mica mixtures are used as a filler since said filler serves to provide "inter-particle connectivity" or physical crosslinking.

Figure 3:
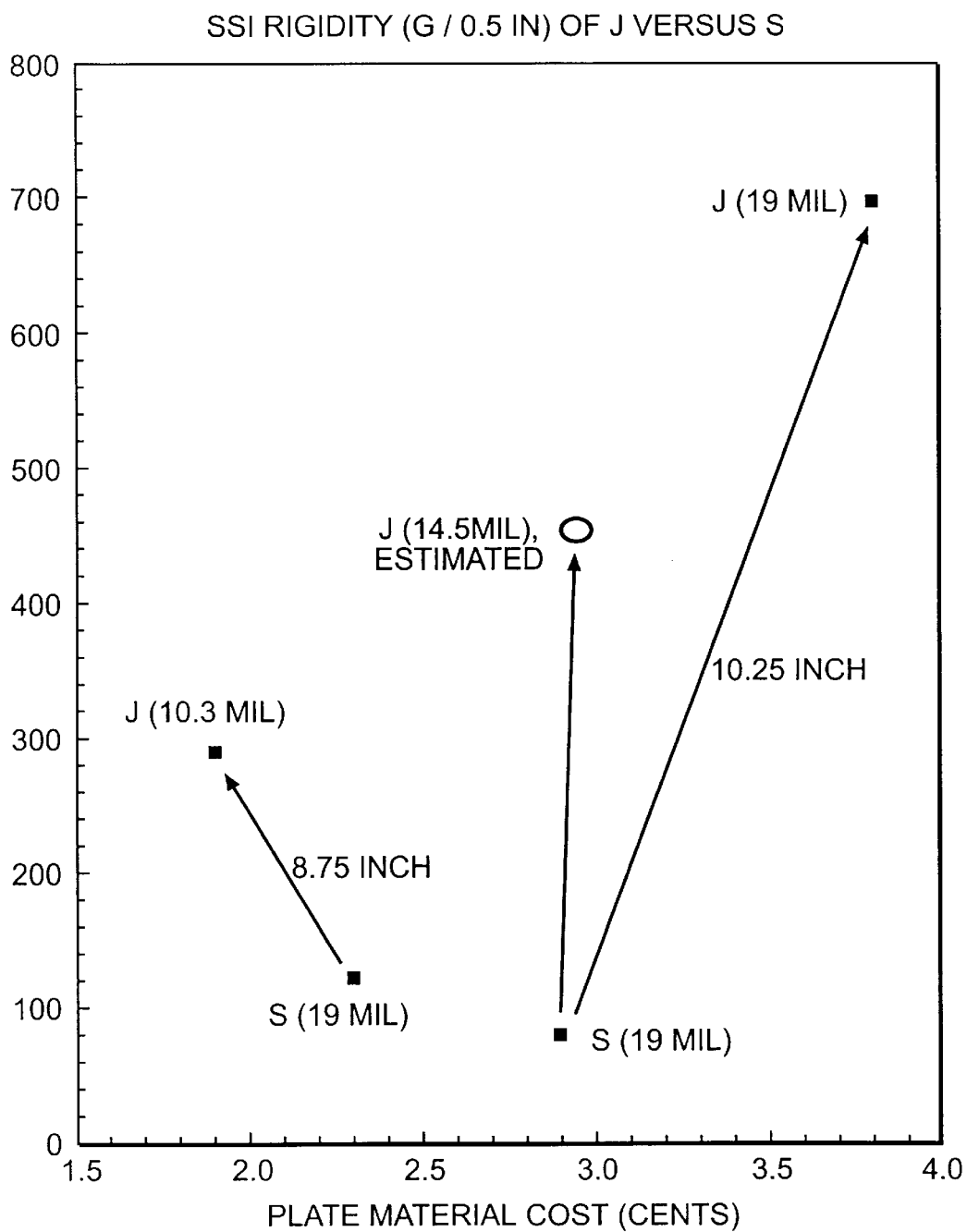
FIG. 3 is a graph comparing the rigidity of the plates of this invention with prior art commercial products in the context of current material costs.

SSI rigidity is measured with the Single Service Institute Plate Rigidity Tester originally available through Single Service Institute, 1025 Connecticut Ave. NW, Washington D.C. This test is designed to measure the rigidity (i.e. resistance to buckling and bending) of single service paper and plastic plates, bowls, dishes, and trays by measuring the force required to deflect the rim of these products a distance of 0.5 inch while the product is supported at its geometric center. Specifically, the plate specimen is held by a spring loaded clamp on one side and is center fulcrum supported. The rim or flange side opposite to the clamped side is subjected to 0.5 inch deflection by means of a motorized cam assembly equipped with a load cell, and the force (grams) is recorded. SSI rigidity is expressed as grams per 0.5 inch deflection. A higher SSI value is desirable since this indicates a more rigid product. All measurements were done at room temperature and geometric mean averages for the machine and cross machine direction are reported. As shown in FIG. 3, Fort James's containers and plates of this invention (designation J) have a higher SSI rigidity than commercial plates manufactured by Solo Cup Company (designation S) at equal or lower cost.

Plastic cast sheet extrusion equipment is suitable for the manufacture of multilayered or single layered mica filled sheets of a polyolefin selected from the group consisting of polypropylene, polypropylene polyethylene copolymer or blend, and mixtures of these.

The use of coupling agents promotes good interfacial bonding between the platy mineral filler and the matrix resin interface resulting in good solid state mechanical properties of the containers and plates. The containers in the form of a 8.75-inch plate at a basis weight of about at least 175 pounds per 3000 square foot ream have a SSI rigidity of at least 250 grams per 0.5 inches. For 10.25-inch plates at a basis weight of about 280 pounds per 3000 square foot ream, the SSI rigidity is at least about 400 grams per 0.5 inches. In plates of this invention, the basis weight is determined from the micronodular surface. At a basis weight of about 130, the SSI rigidity is about 200 grams per 0.5 inch and at a basis weight of about 360 the SSI rigidity is about 700 grams per 0.5 inch. The coupling agents also maximize the melt strength enhancing effect of the platy inorganic mineral filler. Melt strength of the sheets is further improved when mica is used as a filler since geometry of the mineral in the form of high aspect ratio flakes serves to provide "inter-particle connectivity" or physical crosslinking.

In FIG. 1 a process is shown for the manufacture of a single layer mica filled polypropylene sheet. Previously compounded and pelletized mixtures of polypropylene, mica, and other additives are gravity fed by a hopper (10) into the feed zone of a single screw extruder system. Primary extruder (11) has a 2 inch diameter screw with a 24/1 length to diameter ratio. Optionally, multilayer coextruded sheet can be produced by utilizing at least one additional single screw extruder (12, 13, 14) in conjunction with a combining feedblock with proper melt piping and manifold arrangements. Suitably one to seven screw extruders are employed, preferably three. A flexible lip flat sheet die (15) having a width of 31 inches was used.

The sheet of this invention (16) enters the sheet takeoff portion (i.e., after the molten material exits the die) comprising a three-roll polishing/casing unit (17) with individually temperature controlled rolls, a two-rubber roll sheet pull unit (18), and a dual turret, dual shaft winder, whereby only one shaft winder roll (19) may be used. The three takeoff units were mechanically tied together, were on a common track, and can be automatically traversed from close die lip proximity to about 36 inch distant. During the extrusion process, the distance between the die exit and the casting unit were maintained at 2 inches. These three chrome rolls comprising the sheet casting unit are individually temperature controlled by integral oil circulating pumps and heat exchangers and nip gaps are adjustable. A speed differential between cast rolls and pull rolls is normally maintained such that pull roll speed is approximately within ten percent (10%) of cast roll speed. Achievable line speeds are in the range of 1–12.5 feet per minute, while for a sheet on the order of 20 mil thick, the line speed is about 5–6 feet per minute. The sheet is wound on a roll (19). Table 1 shows the sheet process conditions employed for the sheet extrusion of mica filled polypropylene and the unfilled polypropylene control. These sheets suitably have a basis weight of about 200 to 950, per 3000 square foot ream preferably about 200 to 400 per 3000 square foot ream.

Thermoforming is the pressing or squeezing of pliable material into final shape. In the simplest form, thermoforming is the draping of a softened sheet over a shaped mold. In the more advanced form, thermoforming is the automatic, high speed positioning of a sheet having an accurately controlled temperature into a pneumatically actuated forming station whereby the article's shape is defined by the mold, followed by trimming and regrind collection.

Forming techniques other than conventional thermoforming are also suitable for the manufacture of articles described in the present invention. These include variations such as presoftening the extruded sheet to temperatures below the final melting temperature, cutting flat regions (i.e., blanks) from the sheet, transfer of blanks by gravity or mechanical means into matched molds whereby the blanks are shaped into the article by heat and pressure. The sheet from which the blanks have been cut out is collected as regrind and is recyclable. Conventional paperboard pressing equipment and corresponding forming tooling is optionally modified to produce articles of this invention.

The extruded sheet used in the suitable forming, and thermoforming process, or the preferred thermoforming process as shown in FIG. 2 has a thickness of about 0.010 to 0.080 inches, suitably 0.010 to 0.050 inches. For plates the preferred thickness is about 0.015 to 0.025 inches. Suitable mica filler loading level in the extruded sheet is in the range of 10 to 60 weight percent, more preferably 20–50 weight percent, most preferably 20 to 35 weight percent. The mica flake aspect ratio is in the range of 30–300, more preferably 15–250, with particle size range of about 10 to 500 microns. The extruded sheet comprises isotactic polypropylene homopolymer or polypropylene polyethylene copolymer or blend or a mixture of these as base resin, preferably having a melt flow index in the range 0.1–5.0, more preferably 0.2–2.0. Propylene copolymers or blends with ethylene levels in the range of 1–10 mole percent, more preferably 2–5 mole percent, are optionally used.

The preferred type of mica is muscovite, which is the most common form in commerce. Optionally other less common mica types such as phlogopite, biotite, and fluorphlogopite are used. Although there are an infinite number of compositions possible for these four generic types due to isomorphous substitution which are mine specific, the selection of particular grades is driven by particle aspect ratio, particle size, price, and availability.

The melt flow rate (MFR) or melt index is a common and simple method for determining the flow properties of molten polymers. Resin is introduced and melted in a cylindrical space. After temperature equilibration is reached, a weight is used to push a plunger vertically downward whereby the resin is extruded through a narrow orifice. The usual test temperature for polypropylene is 230° C. and the load is 2.16 Kg. Extruded material is collected and weighed and the time required to extrude a specific weight is recorded. MFR is expressed as grams per 10 minutes, which is the weight of material extruded in a 10 minute time period. MFR is inversely proportional to both polymer viscosity and polymer molecular weight.

The extruded sheet comprises coupling agents, preferably modified polypropylene, suitable modifiers are maleic anhydride or acrylic modified polypropylene. The maleic anhydride or acrylic modified polypropylene comprises about 0.5 to 3 weight percent of total sheet composition.

Suitably the extruded sheet comprises coloring agents for aesthetic appeal, preferably titanium dioxide, carbon black, and other opacifying agents in the range of 0.5–8 weight percent based on total composition, preferably 2.5 to 6.5 weight percent. The extruded sheet comprises minor amounts of other additives such as lubricants and antioxidants. These articles of manufacture may be suitably colored with pigments or dyes. Pigments are defined as small insoluble organic or inorganic particles dispersed in the resin medium to promote opacity or translucency. Usual pigments include carbon black, titanium dioxide, zinc oxide, iron oxides, and mixed metal oxides. Dyes are organic and soluble in the plastic, and may be used alone or in combination with pigments to brighten up pigment based colors. All such colorants may be used in a variety of modes which include dry color, conventional color concentrates, liquid color and precolored resin.

Mica filled polypropylene sheets are suitably formed into plates, bowls, cups, trays, buckets, soufflé dishes, and containers using a forming or thermoforming process disclosed herein. In the preferred process, these articles of manufacture and containers are made using the Comet Starlett Thermoformer Unit. This machine is capable of vacuum forming products from heat softened thermoplastic materials and is schematically depicted in FIG. 2. Sheet portions (23) having dimensions of 17.5 inches by 16.25 inches were clamped on two opposing sides and inserted into an oven (22) equipped with upper (20) and lower (21) heaters, whereby heater input settings were in the range of 20–30 percent and hold times were on the order of 60–80 seconds. Under these conditions, the oven air temperature as recorded by a digital thermocouple was in the range of 221° F. to 225° F., while the sheet surface temperature, as recorded by adhering indicator thermocouples, was approximately 330° F. to 340° F.

When the clamped and heat softened sheet (23) exits the oven (22), it may be vacuum formed by either procedure (A) or (B), both of which utilize only one mold which is fabricated from epoxy thermoset materials. Mode (A) uses a male mold (24) whereby the sheet is sucked up to conform to it by means of vacuum where the vacuum ports are present on the mold base as well as on the periphery side of the container (i.e., flange area). Mode (B) arrangement is such that the vacuum direction is opposite to mode (A), where again vacuum holes are located around the base and periphery. In the case of mode (B), a female mold (25) is used, and this arrangement is preferred since the air side of the sheet corresponds to the food contact side. The food contact side undergoes a beneficial texturizing effect as a result of the heat treatment, whereby the resin flows around and outward from the mica particles close to the surface causing the mineral to become more exposed which creates a micronodular surface as manifested by decreased gloss and increased surface roughness. The micronodular surface gives the container a stoneware or pottery-like appearance.

Figure 22A:
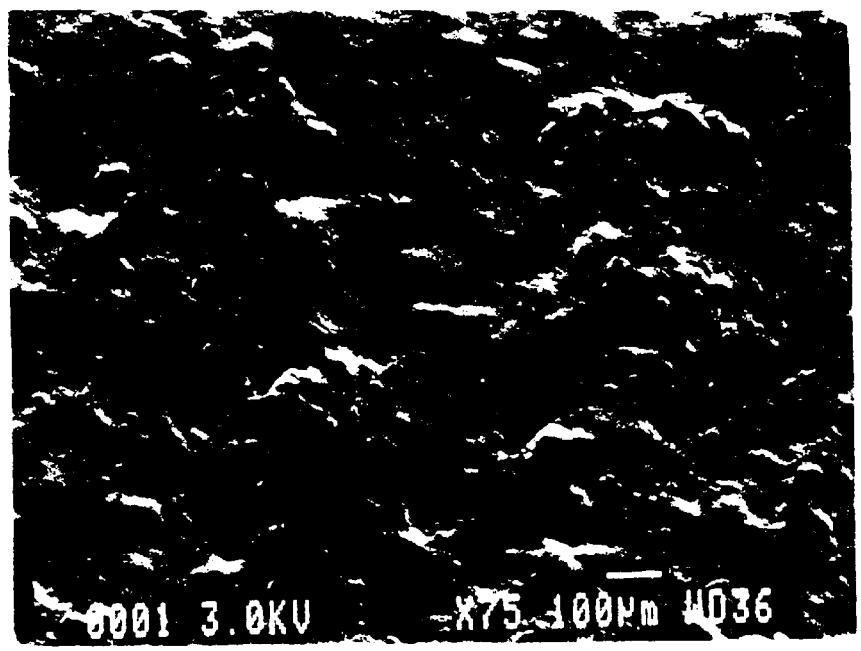
FIG. 22 is a scanning electron photomicrograph of a plate (upper picture) and a sheet (lower picture) of this invention showing the micronodular food contact surface of the plate but not so for the neat extruded sheet.
Figure 22B:
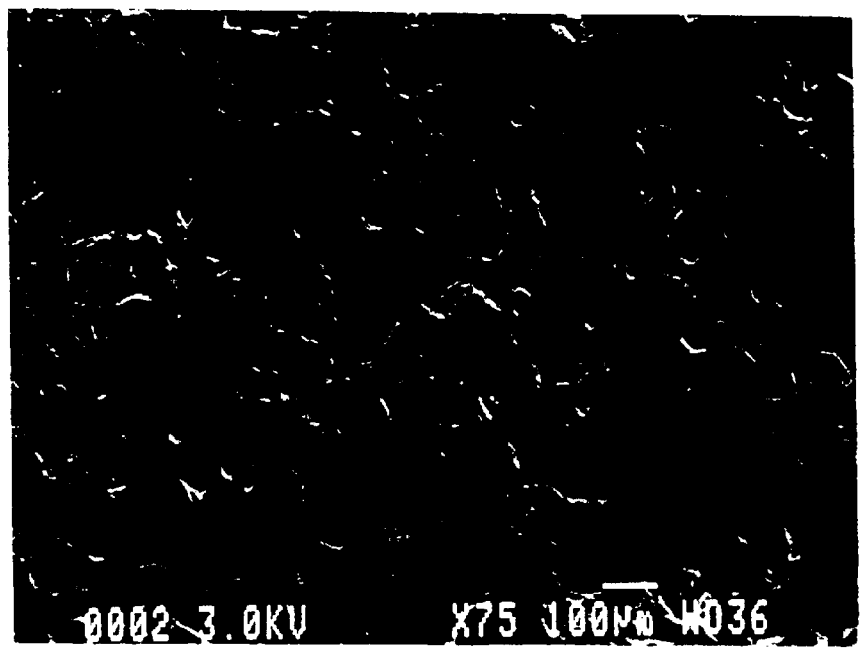

This feature can be reasonably seen by reviewing FIG. 22 where the micronodular structure of the plate is clearly shown in the black and white scanning electron photomicrograph while the neat extruded sheet exhibits no such micronodular surface. The photomicrograph was obtained from a 10×15 mm piece cut out of the plate bottom. The sheet sample was mounted with surface of interest up on a specimen stub, and coated with gold/palladium. The stub was placed in a JEOL 840A Scanning Electron Microscope (SEM). Photomicrographs of the samples were taken at 75× magnification, 30 degree tilt, 39 mm working distance at 3 kv.

Suitably a process for forming a microwaveable, food contact compatible, disposable, rigid and strong, mica-filled polyolefin container, plate, bucket, etc., wherein the polyolefin is selected from polypropylene, polypropylene polyethylene copolymer or blend comprise the steps of:

(a) forming an extrudable admixture of the polyolefin resin and mica;

(b) extruding said extrudable admixture of the polyolefin resin and mica at elevated temperature;

(c) passing the resulting extruded admixture of the polyolefin resin and mica through a multiple roll stack, at least one roll of said roll stack having a matte finish;

(d) passing said extruded admixture of the polyolefin resin and mica at least partially around said roll having a matte finish;

(e) controlling the speed of said extrusion process, the size, temperature and configuration of said roll stack such that the surface of said extruded admixture of polyolefin resin and mica not in contact with said matte roll has a coarse-grained structure; and (f) thermoforming said extruded admixture of polyolefin, resin, and mica and recovering a container, plate, bucket, etc., having a micronodular surface and a rough surface, exhibiting a mefting point of no less than about 250° F.; said container, plate, bucket, etc., being dimensionally stable and resistant to grease, sugar, and water at temperatures up to about 220° F. and having sufficient toughness to be resistant to cutting by serrated flatware.

Advantageously, the coarse-grained structure of the surface of said extruded admixture of polyolefin resin and mica not in contact with said matte roll is formed by transversing the extruded admixture of the polyolefin resin and mica through a curvilinear path and at least partially solidifying the surface of said extruded admixture of polyolefin resin and mica not contacting said matte roll while that surface is in tension relative to the surface contacting said matte roll.

Preferably a process for forming a mica-filled polypropylene container, plate, bucket, tray, bowl, etc., comprises the steps of:

(a) forming an extrudable admixture of the polypropylene resin and mica;

(b) extruding said extrudable admixture of the polypropylene resin and mica at elevated temperature;

(c) passing the resulting extruded admixture of the polypropylene resin and mica through a multiple roll stack, at least one roll of said roll stack having a matte finish;

(d) passing said extruded admixture of the polypropylene resin and mica at least partially around said roll having a matte finish;

(e) controlling the speed of said extrusion process, the size, temperature and configuration of said roll stack such that the surface of said extruded admixture of the polypropylene resin and mica in contact with said matte roll has a matted structure; and (f) thermoforming said extruded admixture of polypropylene, resin, and the mica and recovering a container, plate, bucket, etc., having a micronodular surface and exhibiting a melting point of no less than 250° F., said container, plate, bucket, etc. being dimensionally stable and resistant to grease, sugar, and water at temperatures up to about 220° F. and having sufficient toughness to be resistant to cutting by serrated flatware.

A process for forming a mica-filled polypropylene sheet suitable for thermoforming micronodular containers and plates comprises the steps of:

(a) forming an extrudable admixture of the polypropylene resin and mica;

(b) extruding said extrudable admixture of the polypropylene resin and mica at elevated temperature;

(c) passing the resulting extruded admixture of the polypropylene resin and mica through a multiple roll stack, at least one roll of said roll stack having a matte finish;

(d) passing said extruded admixture of the polypropylene resin and mica at least partially around said roll having a matte finish;

(e) controlling the speed of said extrusion process, the size, temperature and configuration of said roll stack such that the surface of said extruded admixture of the polypropylene resin and mica not in contact with said matte roll has a coarse structure; and (f) the surface in contact with the matte roll has a matted surface; and (g) recovering a sheet having a matted surface and a coarse surface said sheet comprising polypropylene and mica moieties. In this process the polypropylene may be partially replaced with polypropylene polyethylene copolymer or blend. Usually the copolymer compresses less than ten mole percent of the total polyolefin content of the sheet.

Advantageously, other thermoforming arrangements are suitable and may be preferred in conventional sheet and web feed thermoforming commercial production operations. Alternative arrangements include the use of drape, vacuum, pressure, free blowing, matched die, billow drape, vacuum snap-back, billow vacuum, plug assist vacuum, plug assist pressure, pressure reverse draw with plug assist vacuum, reverse draw with plug assist, pressure bubble immersion, trapped sheet, slip, diaphragm, twin-sheet cut sheet, twin-sheet rollfed forming or any suitable combinations of the above. Details are provided in J. L. Throne's book, *Thermoforming*, published in 1987 by Coulthard. Pages 21 through 29 of that book are incorporated herein by reference. Suitable alternate arrangements also include a pillow forming technique which creates a positive air pressure between two heat softened sheets to inflate them against a clamped male/female mold system to produce a hollow product. Metal molds are etched with patterns ranging from fine to coarse in order to simulate a natural or grain like texturized look. Suitably formed articles are trimmed in line with a cutting die and regrind is optionally reused since the material is thermoplastic in nature. Other arrangements for productivity enhancements include the simultaneous forming of multiple articles with multiple dies in order to maximize throughput and minimize scrap.

The sheet of the present invention is suitably formed into plates or bowls having a circular configuration. These articles of manufacture may also be square or rectangular in shape having angular corners, such as found in a tray. Further, additional shapes such as triangular, multi-sided, polyhexal, etc., are contemplated including compartmented trays and plates as well as oval platters. In each contemplated embodiment, all corners are rounded or curved with the preferred embodiment of the present invention being depicted in FIGS. 5 through 21.

The description of FIGS. 5 through 21 is illustrative of the present invention, but it should be understood that these figures are not intended to limit the invention and that various changes may be made by those skilled in the art without changing the essential characteristics and basic concept of the invention. In one embodiment of this invention the plates have the DIXIE® Superstrong profile as illustrated in FIGS. 5 through 8 and also described in U.S. Pat. No. 5,326,020 assigned to the assignee of the present invention and incorporated herein by reference into this application. These containers also may have other features such as ridges, emboss, and deboss patterns suitable for enhancing the properties of the containers of this invention.

Figure 6B:
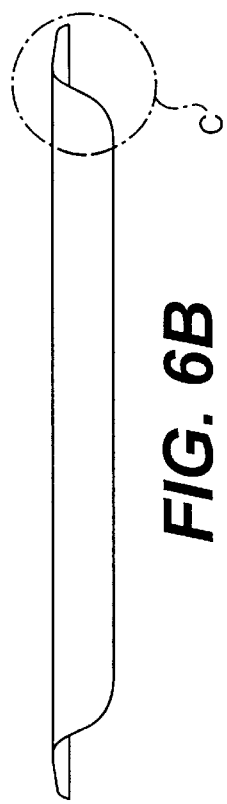
FIG. 6 is a cross sectional view of the plate shown in FIG. 5.
Figure 6C:
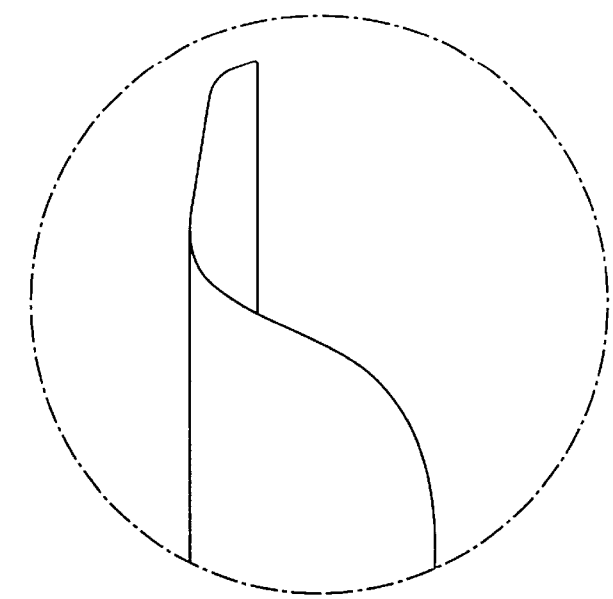
Figure 6A:
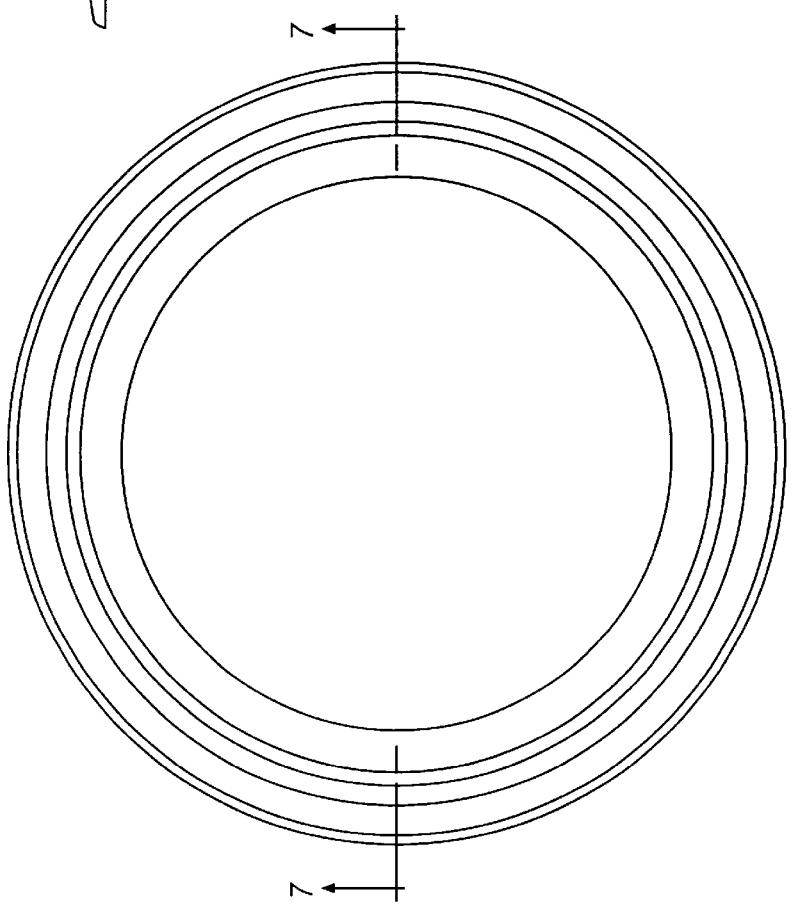
Figure 7:
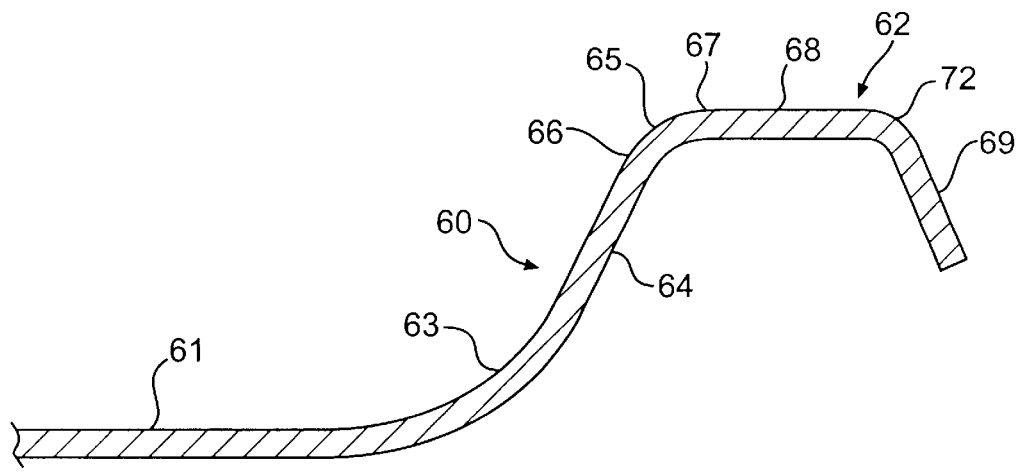
FIG. 7 is a radial cross-section of the plate shown in FIG. 5.
Figure 8:
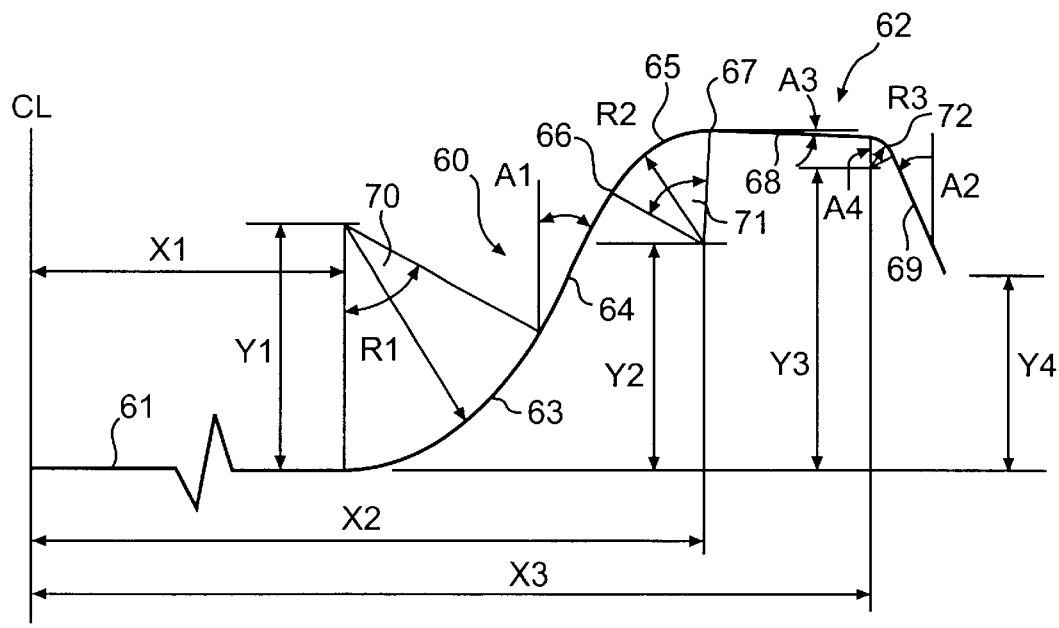
FIG. 8 is a schematic profile of the plate shown in FIG. 5, beginning from the center line of the plate, formed in accordance with the present invention.
Figure 9B:
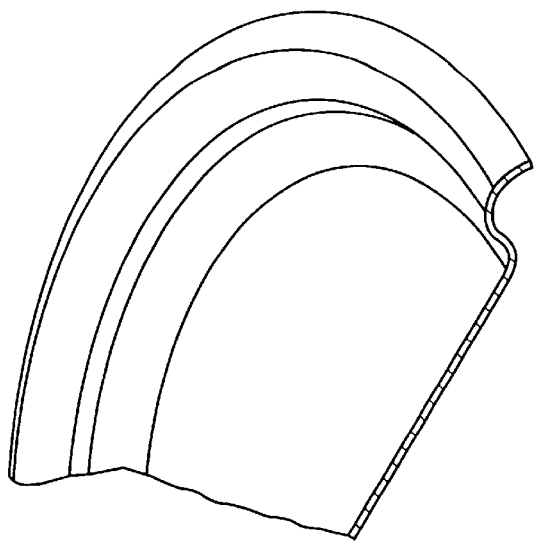
FIG. 9 is a drawing of a plate of this invention.
Figure 9A:
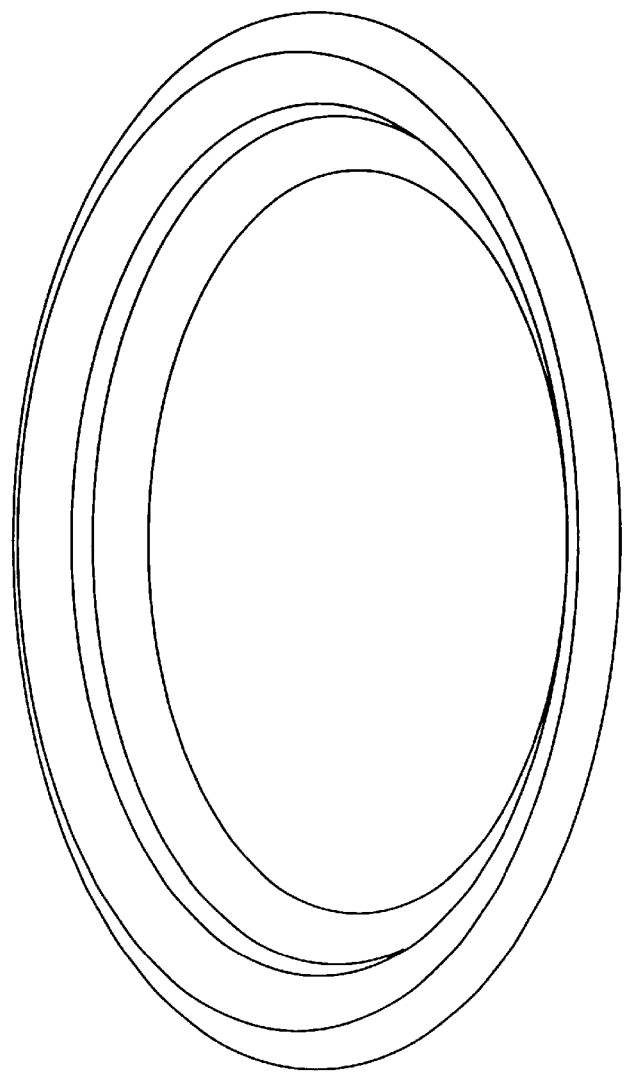
Figure 11:
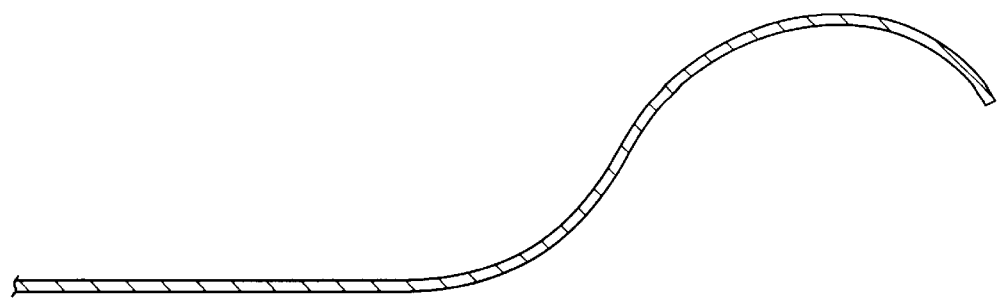
FIG. 11 is a radical cross section of the plate shown in FIG. 9.
Figure 12:
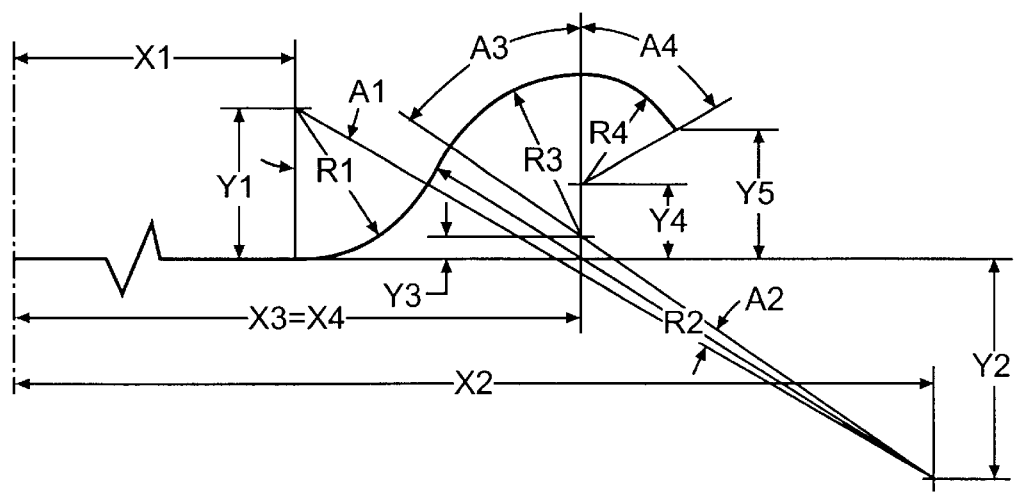
FIG. 12 is a schematic profile of the plate shown in FIG. 9 beginning from the center line.
Figure 15:
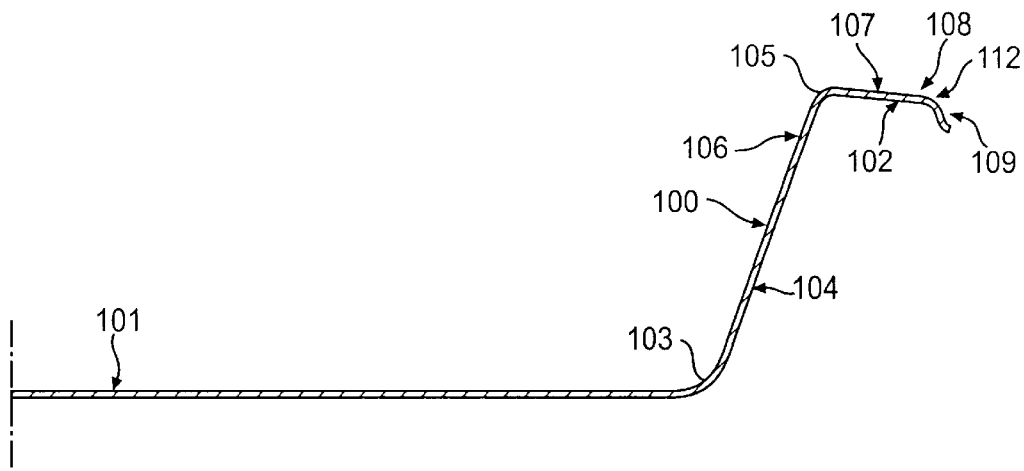
FIG. 15 is a radical cross section of the tray shown in FIG. 13.
Figure 16:
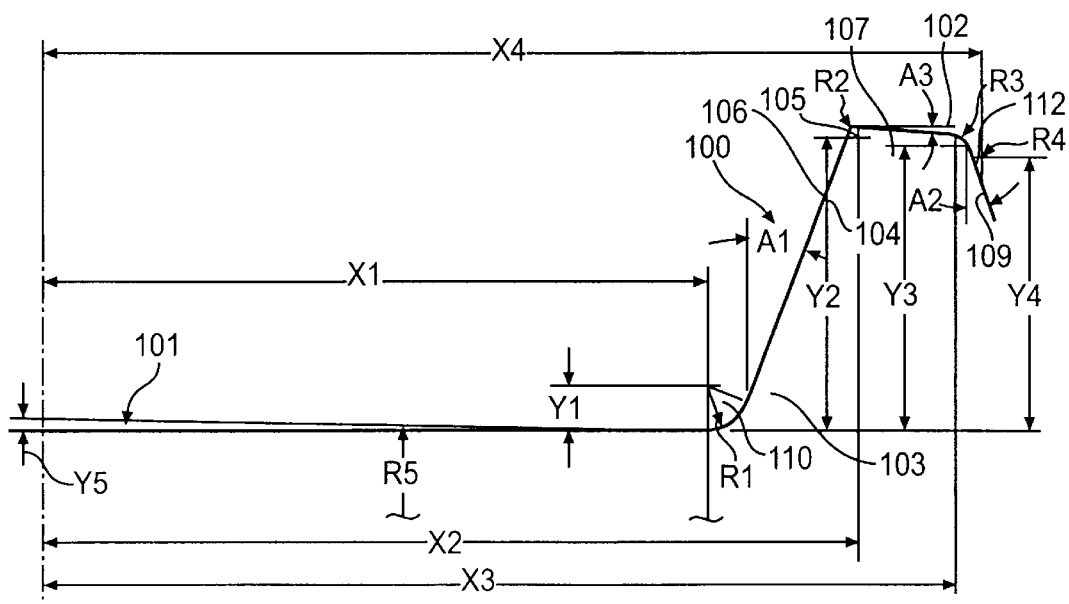
FIG. 16 is a schematic profile of the tray shown in FIG. 13 beginning from the center line.
Figure 17B:
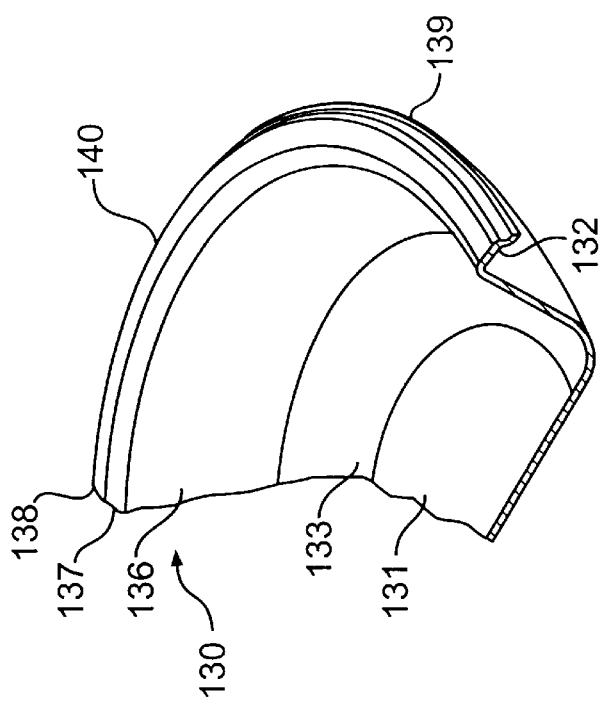
FIG. 17 is a drawing of a bowl of this invention.
Figure 17A:
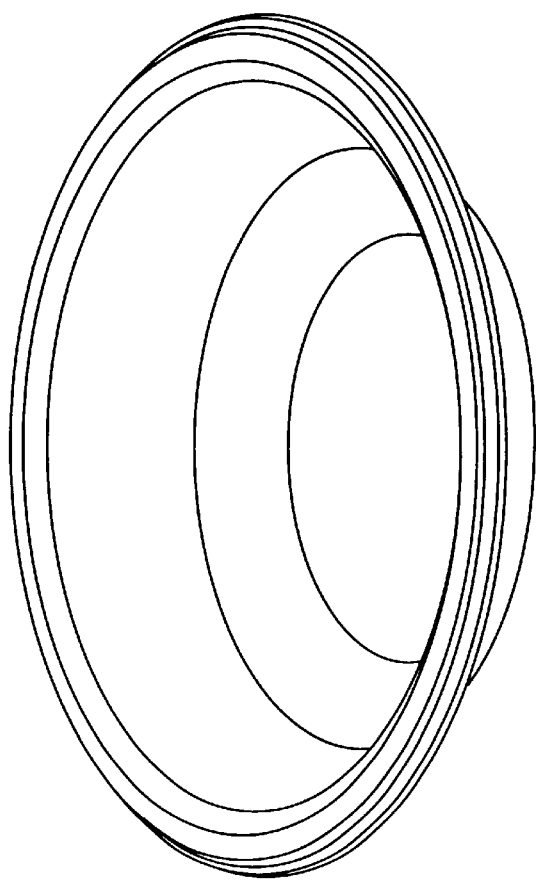
Figure 18B:
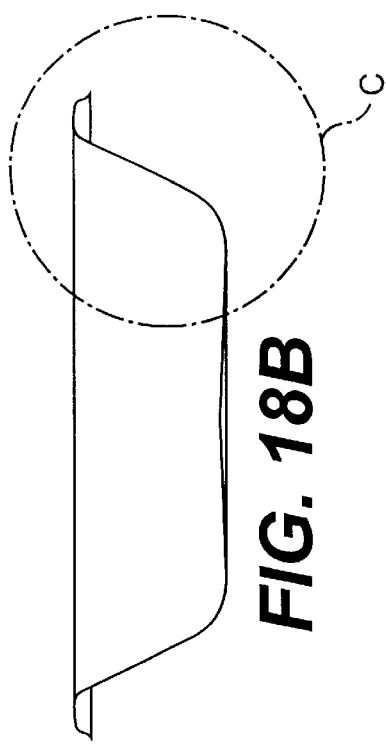
FIG. 18 is a cross-sectional view of the bowl shown in FIG. 17.
Figure 18C:
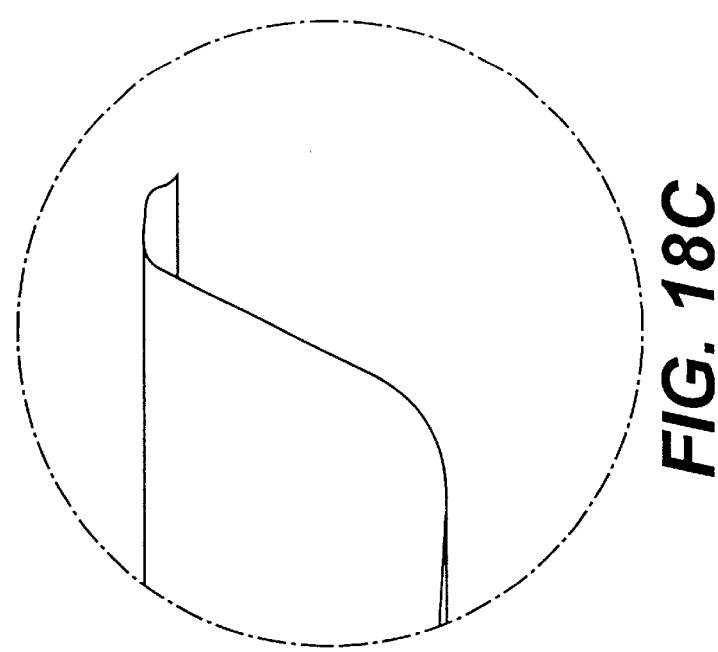
Figure 18A:
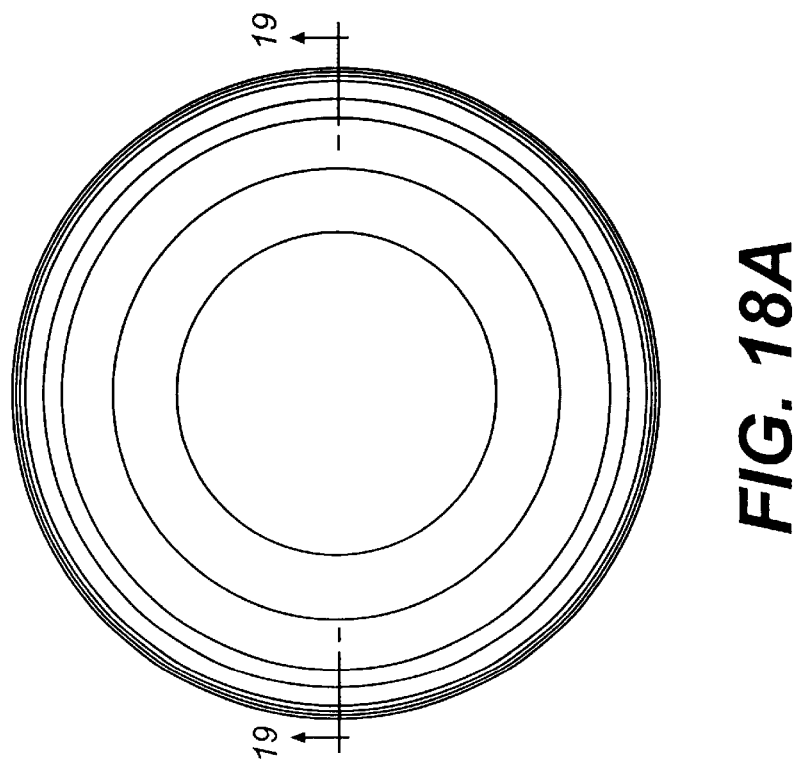
Figure 19:
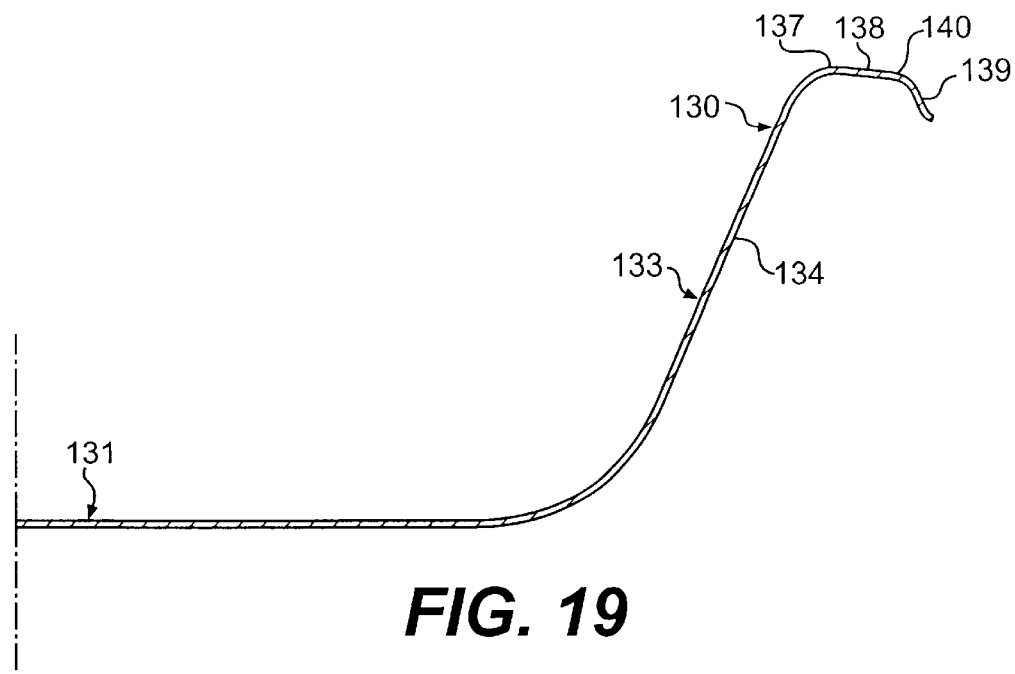
FIG. 19 is a radical cross section of the bowl shown in FIG. 17.
Figure 20:
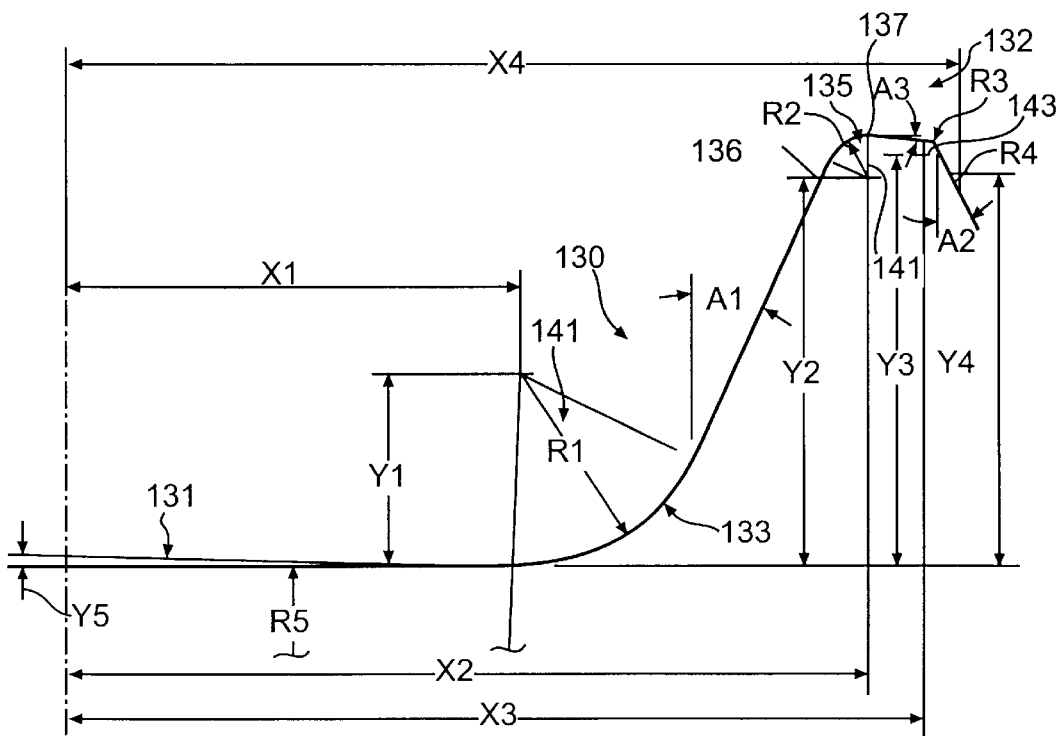
FIG. 20 is a schematic profile of the bowl shown in FIG. 17 beginning from the center line.

Throughout the following description, each of the dimensions are referenced with respect to a given diameter D which in, accordance with the present invention as illustrated in FIGS. 6 and 7, is approximately 8.75 inches. However, the particular diameter of the container is not a critical limitation and is only set forth herein by way of example. It is the relationship between the various portions of the rim configuration which are essential.

The planar inner region (61) in accordance with the illustrated embodiment in FIGS. 5 through 8 has a radius X1 which is equal to approximately 0.3 D–0.4 D and preferably 0.348 D. Adjoining an outer periphery of the planar inner region (61) is a sidewall portion (60) including annular region (63) having a radius of curvature equal to approximately 0.05 D–0.06 D and preferably 0.0572 D with the center point thereof being positioned a distance Y1 from the planar inner region (61). Included angle (70) of the annular region (63) is from about 40° to about 70° and preferably about 60°–65° or approximately 62°. Adjoining the periphery of the annular region (63) is the first frusto-conical region (64) which slopes upwardly at an angle A1 with respect to the vertical from about 20° to about 35° and preferably about 25°–30° or approximately 27.5°. Additionally, the frusto-conical region (64) is of a length greater than about 0.015 D, preferably from about 0.025 D to 0.05 D and more preferably approximately 0.036 D. Further, adjoining the first frusto-conical region (64) is the arcuate annular region (65) which includes a radius of curvature in the range of 0.015 D to 0.03 D and preferably approximately 0.024 D with the center point thereof being positioned a distance Y2 from the planar inner region (61). The included angle (71) of the arcuate annular region (65) may range from about 61° to about 82° and is preferably 66° to 77° or about 730. The second portion (67) of the arcuate annular region (65), that is the distal portion of the arcuate annular region (65), is positioned such that a line tangent to the curvature of the arcuate annular region (65) at the second portion (67) slopes downwardly and outwardly at an angle of approximately 0° to 12°.

The combination of the annular region (63) and arcuate annular region (65) should combine to position the second portion (67) of the arcuate annular region (65) in the manner set forth herein above. That is, the included angle (70) of the annular region (63) when combined with the included angle (71) of the arcuate annular region (65) with the first frusto-conical region (64) spanning therebetween, positions the second portion (67) of the arcuate annular region (65) in a manner such that the second frusto-conical region (68), which extends substantially tangentially from the distal end of the second portion (67) of the arcuate annular region (65) extends outwardly and downwardly at an angle of about 0° to 12°. The second frusto-conical region (68) is of a length in a range from about 0.03 D to about 0.05 D and is preferably 0.04 D. Because the second frusto-conical region (68) extends substantially tangentially from the second portion (67) of the arcuate annular region (65), the second frusto-conical region (68) extends outwardly and downwardly at an angle A3 in the range from approximately 0° to 12° with respect to a horizontal plane formed by the planar inner region (61).

Adjoining an outer periphery of the second frusto-conical region (68) is the lip (69) which is in the form of yet another frusto-conical region which extends outwardly and downwardly from the second frusto-conical region (68). The lip (69) is of a length of at least 0.005 D and is preferably approximately 0.010 D. Further, the lip (69) extends at an angle A2 of no more than 45° from vertical, preferably approximately 15° to 30° with respect to the vertical plane.

At the transition between the second frusto-conical region (68) and the lip (69) is a transition region (72). The transition region (72) includes a radius of curvature R3 which is in the range of about 0.008 D and 0.01 D and is preferably approximately 0.0092 D with the center point thereof being positioned a distance Y3 from the planar inner region (61). Additionally, the transition region (72) has an included angle A4 of approximately 48° to 70°. The plates disclosed in FIGS. 9 through 12 have the dimensions of the plates disclosed in U.S. Pat. No. 5,088,040 and incorporated herein by reference in its entirety. These containers may have other features such as ridges, emboss, and deboss patterns suitable for enhancing the properties of the containers of this invention.

The description of FIGS. 13 through 16 is illustrative of the present invention, but it should be understood that these figures are not intended to limit the invention and that various changes may be made by those skilled in the art without changing the essential characteristics and basic concept of the invention. In one embodiment of this invention the trays have either the DIXIE® Superstrong profile as illustrated in FIGS. 13 through 16 and also described in U.S. Pat. No. 5,326,020 assigned to the assignee of the present invention and incorporated herein by reference into this application. These trays may have other features such as ridges, emboss, and deboss patterns suitable for enhancing the properties of the trays of this invention. A representative tray is illustrated in FIGS. 13 through 16. Throughout the following description, each of the dimensions are referenced to either the length D1 or the width D2, which in accordance with the present invention as illustrated in FIGS. 13 through 16 are approximately 10.90 and 8.00 inches respectively. D1 is larger than or equal to D2. However, the particular length and width of these containers is not a critical limitation and is only set forth herein by way of example. It is the relationship between the various portions of the rim configurations which are essential. The planar inner region (101) in accordance with the illustrated embodiment in FIGS. 13 and 14, has a length X1 which is equal to approximately 0.3 D1 to 0.4 D1 and 0.3 D2 to 0.4 D2 and preferably 0.354 D1 and preferably 0.342 D2. Adjoining an outer periphery of the planar inner region (101) is a sidewall portion (100) including annular region (103) having a radius of curvature equal to approximately 0.02 D1 to 0.03 D1 and 0.025 D2 to 0.035 D2 and preferably 0.023 D1 and 0.031 D2 with the center point thereof being positioned a distance Y1 from the planar inner region (101). Included angle (110) of the annular region (103) is from about 40° to about 80° and preferably about 65° to 75° or approximately 69°. Adjoining the periphery of the annular region (103) is the first frusto-conical region (104) which slopes upwardly at an angle Al with respect to the vertical from about 10° to about 50° and preferably about 15° to 25° or approximately 21°. Additionally, the frusto-conical region (104) is of a length greater than about 0.05 D1 and 0.055 D2, preferably from about 0.1 D1 to 0.2 D1 and 0.15 D2 to 0.25 D2 and more preferably approximately 0.15 D1 and 0.19 D2. Further, adjoining the first frusto-conical region (104) is the arcuate annular region (105) which includes a radius of curvature in the range of 0.005 D1 to 0.007 D1 and 0.007 D2 to 0.009 D2 and preferably approximately 0.006 D1 and 0.008 D2 with the center point thereof being positioned a distance Y2 from the planar inner region (101). The included angle (111) of the arcuate annular region (105) may range from about 40° to about 92° and is preferably 65° to 870. The second portion (107) of the arcuate annular region (105), that is the distal portion of the arcuate annular region (105) is positioned such that a line tangent to the curvature of the arcuate annular region (105) at the second portion (107) slopes downwardly and outwardly at an angle of approximately 0° to 12°.

The combination of the annular region (103) and arcuate region (105) should combine to position the second portion (107) of the arcuate annular region (105) in the manner set forth herein above. That is, the included angle (110) of the annular region (103) combined with the included angle (111) of the arcuate annular region (105) with the first frusto-conical region (104) spanning therebetween, positions the second portion (107) of the arcuate annular region (105) in a manner such that the second frusto-conical region (108), which extends substantially tangentially from the distal end of the second portion (107) of the arcuate annular region (105) extends outwardly and downwardly at an angle of about 0° to 12°. The second frusto-conical region (108) is of a length in a range from about 0.045 D1 to about 0.055 D1 and 0.030 D2 to about 0.040 D2 and is preferably 0.052 D1 and 0.034 D2. Because the second frusto-conical region (108) extends substantially tangentially from the second portion (107) of the arcuate annular region (105), the second frusto-conical region (108) extends outwardly and downwardly at an angle A3 in the range from approximately 0° to 12° with respect to a horizontal plane formed by the planar inner region (101).

Adjoining an outer periphery of the second frusto-conical region (104) is the lip (109) which is in the form of yet another frusto-conical region which extends outwardly and downwardly from the second frusto-conical region (108). The lip (109) is of a length of at least 0.006 D1 and 0.009 D2 and is preferably approximately 0.010 D1 and 0.013 D2. Further, the lip (109) extends at an angle A2 of no more than 45° from vertical, preferably approximately 10° to 30° with respect to the vertical plane and more preferably approximately 20°.

At the transition between the second frusto-conical region (108) and the lip (109) is a transition region (112). The transition region (112) includes a radius of curvature R3 which is in the range of about 0.005 D1 to 0.007 D1 and 0.007 D2 to 0.009 D2 and is preferably approximately 0.006 D1 and 0.008 D2 with the center point thereof being positioned a distance Y3 from the planar inner region (21). Additionally, the transition region (112) has an included angle A4 of approximately 48° to 80°.

The description of FIGS. 17 through 20 is illustrative of the present invention, but it should be understood that these figures are not intended to limit the invention and that various changes may be made by those skilled in the art without changing the essential characteristics and basic concept of the invention. In one embodiment of this invention the bowl is illustrated in FIGS. 17 through 20. These containers may have other features such as ridges, emboss, and deboss patterns suitable for enhancing the properties of the containers of this invention. Throughout the following description, each of the dimensions are referenced with respect to a given diameter D which, in accordance with the present invention as illustrated in FIGS. 17 through 20, is approximately 7.5 inches. However, the particular diameter of the containers is not a critical limitation and is only set forth herein by way of example. It is the relationship between the various portions of the rim configuration which are essential. The planar inner region (131) in accordance with the illustrated embodiment in FIGS. 17 through 20, has a radius X1 which is equal to approximately 0.2 D to 0.3 D and preferably 0.25 D. Adjoining an outer periphery of the planar inner region (131) is a sidewall portion (130) including annular region (133) having a radius of curvature equal to approximately 0.05 D to 0.15 D and preferably 0.11 D with the center point thereof being positioned a distance Y1 from the planar inner region (131). Included angle (141) of the annular region (133) is from about 45° to about 75° and preferably about 60° to 70° or approximately 65°. Adjoining the periphery of the annular region (133) is the first frusto-conical region (134) which slopes upwardly at an angle A1 with respect to the vertical from about 15° to about 45° and preferably about 20° to 30° or approximately 25°. Additionally, the frusto-conical region (134) is of a length greater than about 0.1 D, preferably from about 0.17 D to 0.19 D and more preferably approximately 0.18 D. Further, adjoining the first frusto-conical region (134) is the arcuate annular region (135) which includes a radius of curvature in the range of 0.015 D to 0.030 D and preferably approximately 0.023 D with the center point thereof being positioned a distance Y2 from the planar inner region (131). The included angle (142) of the arcuate annular region (135) may range from about 45° to about 87° and is preferably 60° to 77°. The second portion (137) of the arcuate annular region (135), that is the distal portion of the arcuate annular region (135) is positioned such that a line tangent to the curvature of the arcuate annular region (135) at the second portion (137) slopes downwardly and outwardly at an angle of approximately 0° to 12°.

The combination of the annular region (133) and arcuate annular region (135) should combine to position the second portion (137) of the arcuate annular region (131) in the manner set forth herein above. That is, the included angle (130) of the annular region (133) when combined with the included angle (131) of the arcuate annular region (135) with the first frusto-conical region (134) spanning therebetween, positions the second portion (137) of the arcuate annular region (135) in a manner such that the second frusto-conical region (138), which extends substantially tangentially from the distal end of the second portion (137) of the arcuate annular region (135) extends outwardly and downwardly at an angle of about 0° to 12°. The second frusto-conical region (138) is of a length in a range from about 0.02 D to about 0.04 D and is preferably 0.03 D. Because the second frusto-conical region (138) extends substantially tangentially from the second portion (137) of the arcuate annular region (135), the second frusto-conical region (138) extends outwardly and downwardly at an angle A3 in the range from approximately 0° to 12° with respect to a horizontal plane formed by the planar inner region (131).

Adjoining an outer periphery of the second frusto-conical region (134) is the lip (139) which is in the form of yet another frusto-conical region which extends outwardly and downwardly from the second frusto-conical region (138). The lip (139) is of a length of at least 0.01 D and is preferably approximately 0.017 D. Further, the lip (139) extends at an angle A2 of no more than 45° from vertical, preferably approximately 10° to 30° with respect to the vertical plane and more preferably approximately 25°.

At the transition between the second frusto-conical region (138) and the lip (139) is a transition region (143). The transition region (143) includes a radius of curvature R3 which is in the range of about 0.007 D and 0.012 D and is preferably approximately 0.009 D with the center point thereof being positioned a distance Y3 from the planar inner region (131). Additionally, the transition region (143) has an included angle A4 of approximately 48° to 80°.

Figure 21:
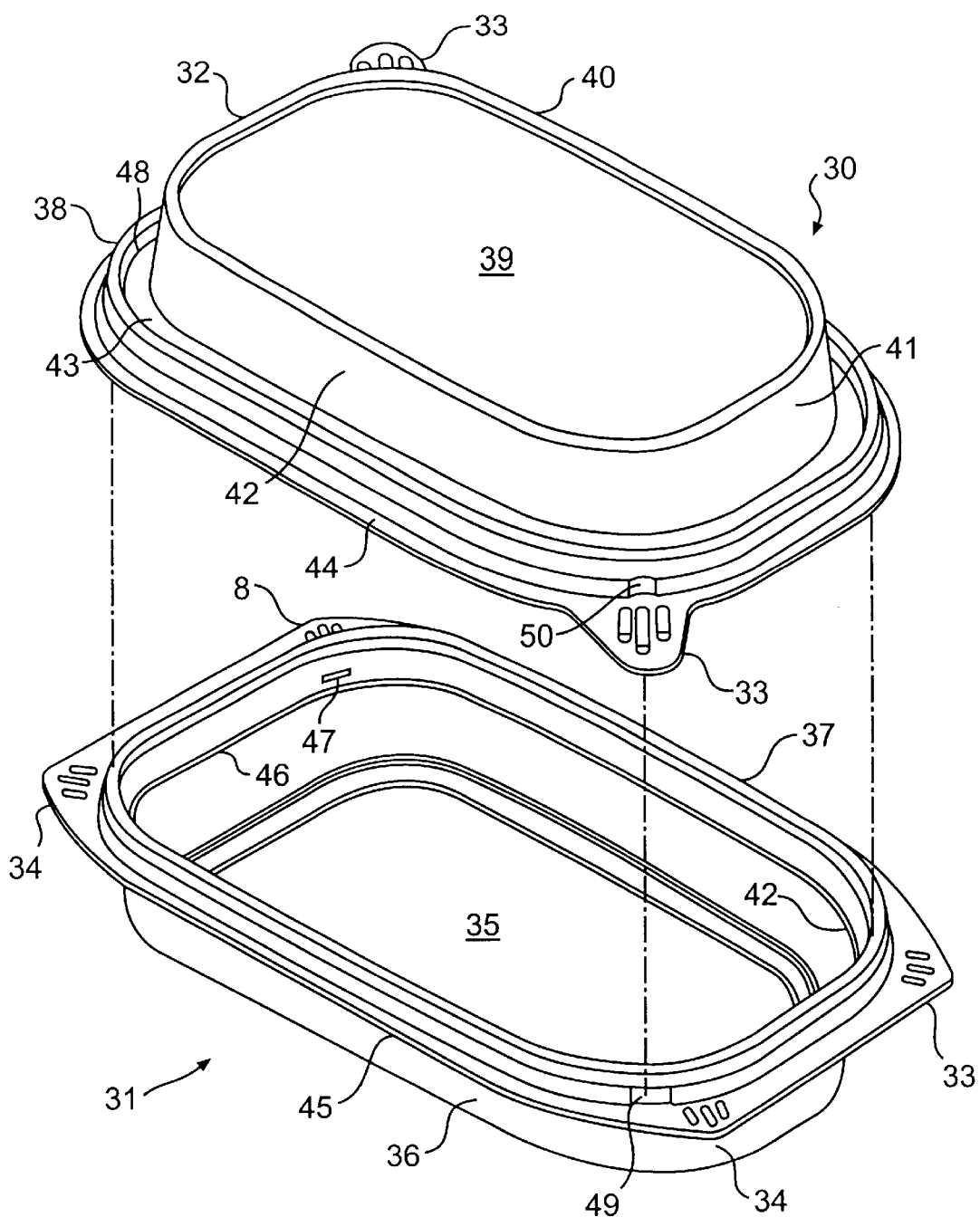
FIG. 21 is a drawing of a take-out food container included in this invention.

The description of FIG. 21 is illustrative of the present invention, but it should be understood that this figure is not intended to limit the invention and that various changes may be made by those skilled in the art without changing the essential characteristics and basic concept of the invention. The containers of this invention may be formed as take-out containers, and as a representative embodiment, a suitable take-out container, will now be described in general with respect to FIG. 21 wherein the lid and base formed as described in U.S. Pat. No. 5,377,860 and incorporated herein by reference is illustrated. While the container illustrated in FIG. 21 is oblong in configuration, the container may be round, oval, substantially rectangular or square as dictated by the contents which are to be placed within the container. The container (30) is formed of a base or bottom portion (31) and a lid (32). The lid (32) includes radially extending opening tabs (33) which cooperate with the radially extending opening tabs (34) of the base (31) in order to allow the consumer to readily open the sealed container. The base (31) of the container (30) includes a substantially planar bottom (35) and a substantially vertically extending peripheral sidewall (36). Integrally connected to the upstanding sidewall (31) is a sealing brim (37) which is received within a cooperating sealing brim (38) of the lid (32).

The lid (32) includes a substantially planar top portion (39) and a rim (40) extending about a periphery of the top portion (39). The rim (40) is provided in order to enhance the strength of an extended volume portion (41) of the lid (32). The rim (40) also serves to locate the base (31) on the lid when the lid is used as a stand.

The extended volume portion (41) is formed by extension wall (42) positioned about the perimeter of the rim (40) and extending downwardly therefrom. The extension wall (42) is integrally formed with a horizontal lid reinforcing ring (43) which is substantially parallel to the top portion (39) of the lid (32). The outer perimeter of the lid reinforcing ring (43) is further integrally formed with the sealing brim (38). Also, extending radially outward from the sealing brim (38) is a second horizontal lid reinforcing ring (44) which extends substantially parallel to the top portion (39) as well.

Similarly, the base (31) includes a horizontal lid reinforcing ring (45) which extends from the periphery of the sealing brim (37) for aiding in and maintaining the structural integrity of the sealing brim (37) as well as the container (30) as a whole. In addition to the reinforcing ring (45), a step (46) may be provided about an upper portion of the peripheral sidewall (36) for preventing nested units from becoming jammed together due to excessive interpenetration when stacked and nested. Also, formed in an upper portion of the sidewall (36) are undercuts (47) which cooperate with detents (48), only one of which is illustrated in FIG. 21 at the integral connection between a brim (38) and lid reinforcing ring (43). The detents, when engaged in the undercuts (47), provide an audible indication that the container is in fact sealed. Additionally, undercuts (49) may be provided in an outer periphery of the brim (37) for receiving detents (50) formed in an outer portion of the brim (38) for again providing an audible indication that the container is sealed. While the container illustrated in FIG. 21 shows detents and undercuts formed in both the inner and outer portions of the brims (47) and (38), respectively, it may be desired to provide respective detents and undercuts on only one side of the brim or to provide no undercuts and detents on either side of the brim.

The Parker Roughness method was used to determine roughness using the Messmer Parker Print-Surf Roughness. Operation procedure details are referenced in the Messmer Instruments Ltd. user manual for the instrument (Model No. ME-90) which is distributed by Huygen Corporation. The flat specimen is clamped under 1 Mpa pressure against a narrow annular surface by a soft backing and the resistance of air flow of the gap between the specimen and the annulus is measured. The air flow is proportional to the cube of the gap width and the roughness is expressed as the root mean cube gap in units of micrometers. Higher Parker roughness values indicate higher degrees of surface roughness. Gloss is reported as "gloss units at 75 or 60 degrees." Gloss measurements were conducted following TAPPI Standard Method T-480-OM 92.

Hunter color L, a, and b parameters were measured using TAPPI Method T 524 OM-94. The symbols L, a, b designate color values as follows: L denotes lightness increasing from zero for black to 100 for perfect white; a shows redness when plus, greenness when minus, and zero for gray; and b represents yellowness when plus, blueness when minus, and zero for gray.

Whiteness index was measured according to procedures outlined in the publication "*Measurement and Control of the Optical Properties of Paper*" by Technidyne Corporation, New Albany, Ind.

The following examples are illustrative of the present invention. It should be understood that the examples are not intended to limit the invention and that various changes may be made by those skilled in the art without changing the essential characteristics and the basic concept of the invention.

EXAMPLE 1

Mica filled polypropylene sheets (20 mil) and unfilled polypropylene sheets (22 mil) were extruded, as shown in FIG. 1, with conditions specified in Table 1. These extrusion process conditions may be varied as necessary to produce sheets which are of acceptable quality. Specifically, the operable temperature ranges for barrel zones 1, 2, and 3 are about respectively, 350 to 425° F., 400 to 450° F., and 450 to 500° F. The adaptor, feedblock, and die temperatures can all be in about the range of 450 to 500° F. The range of values for extruder drive amperes, extruder speed, melt pressure, die pressure, chill roll temperature, and line speed are about respectively, 12 to 20 amp., 60 to 100 RPM, 1500 to 2500 psi, 450 to 650 psi, 120 to 140° F., and 3 to 8 FPM. Sheets were subsequently vacuum thermoformed into plates and other containers and lids as set forth in FIGS. 5 through 21. Tables 2 and 3 show, respectively, rigidity values and caliper data for the sidewall, bottom, and flange (rim) areas of vacuum formed plates using condition (B) of FIG. 2 and having a dimension of 10.25 or 8.75 inches. In each table, individual rigidity values are shown for each specimen. In addition, the caliper uniformity for sidewall, bottom, and flange areas are reported for each specimen, along with the summary statistics. Specifically, the caliper of each plate specimen in Tables 2 and 3 was measured ten times using a Fowler gauge for each of the three regions of interest consisting of the sidewall, bottom, and flange areas, and the average value for each plate specimen is reported along with the corresponding standard deviation (i.e., individual plate statistics). In the case of the three plates of Table 2, the caliper summary statistics (expressed in the average properties row) were obtained on the basis of averaging 30 measurements, wherein the standard deviation is reported for each of the three regions of interest. In the case of the five plates of Table 3, the caliper summary statistics were calculated on the basis of averaging 50 measurements where again the standard deviation is reported for each of the three regions of interest. Therefore, the caliper data of Tables 2 and 3 located in the average property rows pertain to global statistics rather than individual plate statistics. The caliper uniformity parameter consists of the coefficient of variation (COV) which is calculated as the standard deviation of caliper divided by the mean caliper, whereas the ratio is multiplied by 100, whereas the above described global averages and associated standard deviations are employed. A lower COV value is desirable since it signifies improved caliper uniformity for mica filled polypropylene plates with respect to unfilled polypropylene plates. Tables 2 and 3 show that mica reduces COV of polypropylene from 9.9 to 4.3 in sidewall and from 9.6 to 2.0 in the flange area. Therefore, caliper uniformity in sidewall improved by more than a factor of 2 and caliper uniformity in the flange improved by over a factor of 4. The improvement of caliper uniformity is critical for promoting plate dimensional stability during food transport and microwave cooking operations. In great contrast to mica filled polypropylene plates, the unfilled polypropylene plates exhibited poor quality as evidenced by poorly defined rim area, and sharkskin, very rough surface. These data demonstrate that mica greatly improves the drawability of polypropylene as evidenced by improved caliper uniformity, as well as improved thermoformability, both of which are due to enhanced melt strength relative to unfilled polypropylene. Mica is the preferred reinforcing mineral filler for enhancing the melt strength because of its highly regular, high aspect ratio morphology which can be thought of as resulting in "inter-particle connectivity" or "physical crosslinking." The significant reinforcing effect of mica is also evidenced by a SSI plate rigidity value of 671 grams per 0.5 inches for PP/mica at a basis weight of about 350 lbs. per 3000 square foot ream versus 342 grams per 0.5 inches for unfilled PP at a basis weight of about 280 lbs. per 3000 square foot ream.

TABLE 1

Sheet Extrusion Conditions for
Mica Filled Polypropylene and Unfilled Polypropylene

| CONDITION | PP/MICA | UNFILLED PP |
|---|---|---|
| Barrel zone 1 (° F.) | 395 | 395 |
| Barrel zone 2 (° F.) | 425 | 425 |
| Barrel zone 3 (° F.) | 475 | 475 |
| Adaptor (° F.) | 470 | 450 |
| Feed block (° F.) | 470 | 460 |
| Die zones 1–3 (° F.) | 470 | 475 |
| Extruder RPM | 80 | 70 |
| Drive amperes | 16 | 19 |
| Melt pressure (psi) | 1700 | 1780 |
| Die pressure (psi) | 550 | 825 |
| Line speed (FPM) | 6.1 | 5.0 |
| Chill roll temp. (° F.) | 130 | 137 |

TABLE 2

Caliper and SSI Rigidity Data for 10-¼ Inch Plates
Thermoformed From Unfilled Polypropylene Sheet

| Plate Specimen ID | SSI Rigidity (g/0.5 in.) | Sidewall Caliper (mil) | Bottom Caliper (mil) | Flange Caliper (mil) |
|---|---|---|---|---|
| 72-6 | 364 | 18.7 ± 1.9 | 20.7 ± 0.8 | 22.9 ± 2.8 |
| (COV)* | | 10.1 | 3.9 | 12.2 |
| 72-7 | 382 | 19.2 ± 2.0 | 20.6 ± 0.4 | 23.3 ± 0.8 |
| (COV) | | 10.4 | 1.9 | 3.4 |
| 72-8 | 280 | 19.6 ± 1.9 | 20.6 ± 0.5 | 23.3 ± 2.8 |
| (COV) | | 9.7 | 2.4 | 12.0 |
| Average Properties | 342 ± 54.4 | 19.19 ± 1.89 | 20.64 ± 0.58 | 23.15 ± 2.21 |
| (COV) | 15.9 | 9.85 | 2.81 | 9.55 |

*COV = Coefficient of Variation

TABLE 3

Caliper and SSI Rigidity Data for 10-¼ inch Plates
Thermoformed From Polypropylene/Mica/TiO$_2$ Sheet

| Plate Specimen ID | SSI Rigidity (g/0.5 in.) | Sidewall Caliper (mil) | Bottom Caliper (mil) | Flange Caliper (mil) |
|---|---|---|---|---|
| 72-1 | 705 | 18.3 ± 1.1 | 17.4 ± 0.5 | 18.2 ± 1.0 |
| (COV)* | | 6.0 | 2.9 | 5.5 |
| 72-2 | 659 | 17.0 ± 1.5 | 17.9 ± 0.7 | 18.4 ± 0.5 |
| (COV) | | 8.8 | 3.9 | 2.7 |
| 72-3 | 654 | 17.3 ± 1.6 | 17.0 ± 0.6 | 18.2 ± 0.7 |
| (COV) | | 9.2 | 3.5 | 3.8 |
| 72-4 | 669 | 16.9 ± 1.2 | 16.7 ± 1.1 | 18.9 ± 0.8 |
| (COV) | | 7.1 | 6.6 | 4.2 |
| 72-5 | 668 | 16.3 ± 1.0 | 16.3 ± 0.9 | 19.0 ± 0.9 |
| (COV) | | 6.1 | 5.5 | 4.7 |
| Average Properties | 671 ± 20 | 17.3 ± 0.76 | 17.1 ± 0.6 | 18.5 ± 0.38 |
| (COV) | 2.98 | 4.3 | 3.5 | 2.0 |

*COV = Coefficient of Variation

EXAMPLE 2

Extruded mica filled polypropylene sheets prepared as described in Example 1 were characterized with respect to surface gloss and roughness. Table 4 shows 75 degree gloss and Parker Roughness (airflow method) data for an extruded mica filled polypropylene sheet versus same properties for the food contact (air) side of vacuum formed 10.25 inch plates produced according to condition (B) of FIG. 2 using the same sheet formulation. The unique thermally induced micronodular surface is characterized by significant decrease in gloss and significant increase in roughness as shown in the two photomicrographs in FIG. 22, which results in a stoneware or pottery like appearance with aesthetic appeal. The Parker Roughness method has been described in this specification prior to the Example section.

TABLE 4

GLOSS AND ROUGHNESS PROPERTIES OF THE FOOD CONTACT SIDE OF POLYPROPYLENE/MICA/TiO$_2$ PLATE SURFACE VERSUS NEAT EXTRUDED SHEET

| SAMPLE ID | GLOSS (75 DEGREES)* | PARKER ROUGHNESS (MICRONS) |
|---|---|---|
| 72-1 (Plate) | 22.4 | 13.41 |
| 72-2 (Plate) | 30.6 | 14.05 |
| 72-3 (Plate) | 24.8 | 14.89 |
| 72-4 (Plate) | 24.3 | 14.24 |
| 72-5 (Plate) | 24.5 | 12.48 |
| PLATE AVERAGE | 25.3 ± 3.1 | 13.8 ± 0.9 |
| 72-12-1 (Sheet) | 45.7 | 5.92 |
| 72-12-2 (Sheet) | 47.2 | 7.43 |
| 72-12-3 (Sheet) | — | 5.89 |
| 72-12-4 (Sheet) | — | 6.35 |
| 72-12-5 (Sheet) | — | 5.84 |
| 72-12-6 (Sheet) | — | 8.15 |
| SHEET AVERAGE | 46.5 | 6.6 ± 0.97 |

*= Average of Machine and Cross Machine Directions

As shown in Table 4, the food contact side is rougher as evidenced by increased roughness and decreased gloss relative to the neat extruded sheet. The rough appearance is desirable for purpose of creating the micronodular surface giving the container and plate a stoneware look.

EXAMPLE 3

Mica filled polypropylene sheets were successfully vacuum thermoformed into 12 oz. oval microwave containers, whereby the base was produced using mode (B) of FIG. 2 and the lid was produced using mode (A) of FIG. 2. In contrast, attempts to form unfilled polypropylene sheet into the same container were not successful.

EXAMPLE 4

Sheet rolls (17.5 inch wide), at three calipers were extruded as described in Example 1 and FIG. 1. Table 5 summarizes the PP/40% mica material and process conditions. Table 6 summarizes the PP/40% mica sheet properties.

TABLE 5

PP/Mica Extrusion Process Conditions Summary

| Plate Size (in.) | Barrel Zone 1 Temp. (F.) Actual/Set | Barrel Zone 2 Temp. (F.) Actual/Set | Barrel Zone 3 Temp. (F.) Actual/Set | Adaptor Temp. (F.) Actual/Set | Feed Block Temp. Actual/Set | Line Speed (fpm) | Die Zone 1 Temp. (F.) Actual/Set |
|---|---|---|---|---|---|---|---|
| 11 | 395/395 | 452/425 | 475/475 | 470/470 | 470/470 | 9.27 | 470/470 |
| 10 | 376/375 | 410/410 | 431/430 | 430/430 | 430/430 | 8.32 | 430/430 |
| 9 | 375/376 | 410/410 | 434/430 | 430/430 | 430/430 | 8.07 | 430/430 |

| Plate Size (in.) | Die Zone 2 Temp. (F.) Actual/Set | Die Zone 3 Temp. (F.) Actual/Set | Screw RPM Actual/Set | Drive Amperes | Melt Pressure (psi) | Die Pressure (psi) | Chill Roll Temp. (F.) Actual/Set |
|---|---|---|---|---|---|---|---|
| 11 | 469/470 | 470/470 | 125 | 18.3 | 1387 | 694 | 130/130 |
| 10 | 430/430 | 430/430 | 130 | 19.3 | 2012 | 737 | 130/130 |
| 9 | 430/430 | 430/430 | 132 | 24.2 | 2112 | 686 | 130/130 |

TABLE 6

PP/Mica Sheet Property Summary

| Plate Size (in.) | Overall Caliper- Avg. (mil) | Overall Basis Weight- Avg. (lb./3000 ft. 2) |
|---|---|---|
| 11 | 18.46 +/− 0.36 | 308.07 +/− 13.72 |
| 10 | 17.20 +/− 0.10 | 288.80 +/− 9.89 |
| 9 | 16.94 +/− 0.10 | 268.11 +/− 7.50 |

EXAMPLE 5

Plates from sheet specifications set forth in Example 4 were produced using 1-up water cooled female molds (with pressure box/vacuum assembly), followed by matched metal punch trimming. Mold temperature was 70° F., while sheet temperatures for the 9, 10, and 11 inch plate runs were respectively 300° F., 310° F., and 295° F. The 9 and 10 inch plates were produced at 20 cycles/minute while the bulk of the 11 inch plates were made at 25 cycles/minute.

Oven temperature control on the commercial machine was good due to the combination of top glass heaters and bottom calrod heaters with proper zoning. In general, higher temperatures produce more micronodularity at the expense of more pronounced sheet sag and wrinkling while low temperatures tend to reduce sag at the expense of diminished stoneware appearance.

Best results (i.e., micronodular matte eating surface without "webbing" or wrinkling) were obtained by increasing the top oven temperature by 3–5° F. and decreasing the bottom by a corresponding amount. This ability to selectively control oven temperature in effect facilitated determination of the preferred process temperature window of PP/mica sheets.

Set forth in Table 7 are the physical properties of plates having the shape set forth in FIGS. 9 through 12 and having a diameter of 9, 10, and 11 inches.

TABLE 7

Plate Physical Property Data

| Product Size | | 9 inch plate | 10 inch plate | 11 inch plate |
|---|---|---|---|---|
| Plates Produced | | 15,000 | 10,000 | 10,000 |
| Plate Weight | Avg. | 18.31 | 24.40 | 32.02 |
| g. | Std. Dev. | 0.27 | 1.01 | 0.86 |
| Basis Weight | Avg. | 248.28 | 266.97 | 288.18 |
| #/ream | Std. Dev. | 3.80 | 9.67 | 7.09 |
| Caliper | Avg. | 15.89 | 16.41 | 17.32 |
| mils | Std. Dev. | 0.48 | 0.49 | 0.86 |
| Dry Rigidity | MD Avg. | 300.2 | 341.6 | 411.9 |
| gms/0.5 inches | Std. Dev. | 56.0 | 56.0 | 30.0 |
| Dry Rigidity | CD Avg. | 307.5 | 345.9 | 417.4 |
| gms/0.5 inches | Std. Dev. | 57.0 | 50.0 | 29.0 |
| Dry Rigidity | GM Avg. | 303.4 | 343.4 | 414.4 |
| gms/0.5 inches | Std. Dev. | 54.0 | 52.0 | 26.0 |
| Gloss | 60° | 3.7 ± 0.6 | 3.7 ± 0.6 | 5.5 ± 1.2 |
| | 75° | 9.0 ± 1.7 | 9.5 ± 2.1 | 15.6 ± 3.4 |
| Color | L* | 80.5 ± 2.8 | 81.3 ± 0.9 | 80.7 ± 0.3 |
| Hunter | a* | 0.67 ± 0.007 | 0.77 ± 0.07 | 1.2 ± 0.1 |
| | b* | 6.3 ± 0.005 | 6.2 ± 0.05 | 6.7 ± 0.1 |

TABLE 7-continued

Plate Physical Property Data

| Product Size | | 9 inch plate | 10 inch plate | 11 inch plate |
|---|---|---|---|---|
| Whiteness Index | % | 33.5 ± 0.7 | 33.9 ± 0.8 | 31.1 ± 0.4 |
| Parker Print Roughness | microns | 16.3 ± 1.63 | 15.9 ± 1.78 | 14.8 ± 1.86 |

EXAMPLE 6

Figure 23:
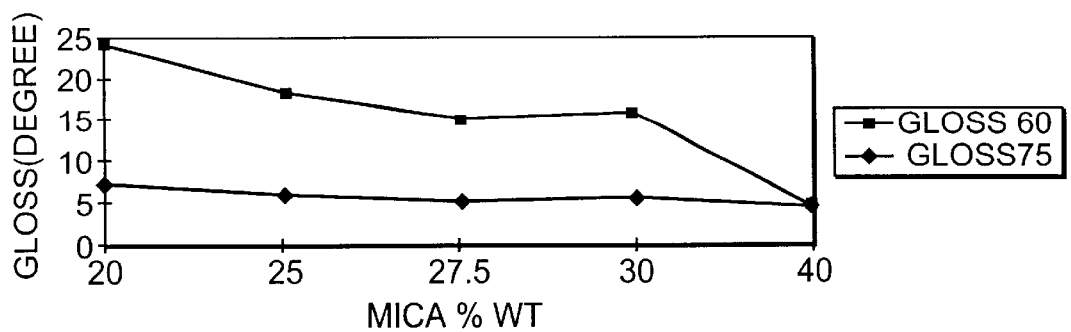
FIG. 23 is a graph plotting gloss versus mica level.
Figure 24:
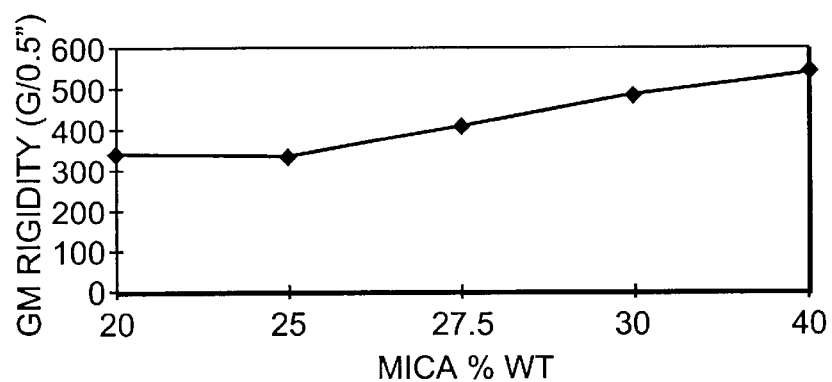
FIG. 24 is a graph plotting the plate rigidity versus mica level.

The sheets and plates were prepared as illustrated in Example 1 and FIGS. 1 and 2. Table 8 shows sheet extrusion and forming conditions. Table 9 contains formulation composition information. Table 9 shows the plate physical test results. FIGS. 23 and 24 show respectively, gloss and plate rigidity versus mica level (at constant mica/TiO$_2$ ratio).

TABLE 8

Extrusion/Forming Conditions

| Barrel Zone 1 | 375° F. |
|---|---|
| Barrel Zone 2 | 410° F. |
| Barrel Zone 3 | 430° F. |
| Adaptor | 430° F. |
| Feedblock | 430° F. |
| Die Zones 1/2/3 | 430° F. |
| RPM | 130 |
| Chill Roll | 130° F. |
| Target Sheet Caliper | 18.3 mil |
| Sheet Width | 18.0 inches |
| Comet Former Top Heater | 20% |
| Comet Former Bottom Heater | 35% |
| Comet Former Time | 50–60 seconds |
| Plate Design | 11 inch (having shape set forth in FIGS. 9–12) |

TABLE 9

Physical Test Properties

| Run No. | Plate Weight (g) | Basis Weight (#/ream) | Caliper (mil) | Dry Rigidity - MD (gm/0.5 in) | Dry Rigidity - CD (gm/0.5 in) | Dry Rigidity - GM (gm/0.5 in) | Mica (Wt %) | TiO$_2$ (Wt. %) |
|---|---|---|---|---|---|---|---|---|
| 1 | 33.52 ± 0.17 | 294.92 ± 2.24 | 16.91 ± 0.08 | 543.0 ± 12.0 | 543.4 ± 11.7 | 543.2 ± 11.6 | 40 | 2.5 |
| 2 | 30.10 ± 0.39 | 259.13 ± 5.04 | 16.12 ± 0.26 | 363.6 ± 15.3 | 363.2 ± 16.2 | 363.4 ± 15.4 | 40 | 2.5 |
| 3 | 31.20 ± 0.17 | 271.34 ± 2.24 | 16.26 ± 0.08 | 468.4 ± 14.4 | 464.8 ± 16.5 | 466.6 ± 15.4 | 40 | 0 |
| 4 | 32.81 ± 0.69 | 288.66 ± 8.48 | 17.40 ± 0.31 | 480.4 ± 38.2 | 482.0 ± 37.6 | 481.2 ± 37.9 | 30 | 1.88 |
| 5 | 29.47 ± 0.09 | 254.82 ± 3.77 | 17.26 ± 0.32 | 338.4 ± 8.6 | 339.6 ± 12.2 | 339.0 ± 9.7 | 20 | 1.25 |
| 6 | 30.17 ± 0.30 | 263.73 ± 2.20 | 17.32 ± 0.32 | 334.7 ± 9.1 | 326.3 ± 5.0 | 330.5 ± 6.8 | 25 | 1.56 |
| 7 | 36.02 ± 1.00 | 313.87 ± 10.98 | 18.26 ± 0.52 | 473.3 ± 48.4 | 479.7 ± 59.7 | 476.5 ± 54.0 | 40 | 2.5 |
| 8 | 33.15 ± 0.37 | 289.62 ± 2.49 | 17.39 ± 0.34 | 440.3 ± 4.0 | 428.0 ± 10.4 | 434.1 ± 4.6 | 40 | 2.5 |
| 9 | 34.74 ± 0.50 | 305.79 ± 2.51 | 17.69 ± 0.24 | 440.3 ± 18.6 | 449.3 ± 11.0 | 444.8 ± 14.6 | 40 | 1.75 |
| 10 | 33.24 ± 0.20 | 291.79 ± 3.18 | 17.07 ± 0.20 | 407.3 ± 4.0 | 409.0 ± 8.5 | 408.2 ± 5.2 | 40 | 1.75 |
| 11 | 36.07 ± 0.30 | 316.39 ± 2.09 | 18.15 ± 0.11 | 501.0 ± 17.3 | 489.7 ± 8.5 | 495.3 ± 12.3 | 40 | 1.0 |
| 12 | 33.84 ± 0.55 | 293.84 ± 4.37 | 17.70 ± 0.28 | 413.0 ± 18.0 | 402.3 ± 19.7 | 407.6 ± 18.6 | 40 | 1.0 |
| 13 | 31.00 ± 0.38 | 271.53 ± 5.09 | 17.81 ± 0.32 | 413.7 ± 45.1 | 405.3 ± 44.4 | 409.4 ± 44.2 | 27.5 | 1.72 |
| 14 | 31.77 | 265.64 | 17.37 ± 0.80 | 384.0 | 372.0 | 378.0 | 25 | 1.56 |
| 15 | 31.02 | 269.00 | 17.41 ± 0.01 | 335.0 | 364.0 | 359.5 | 30 | 1.87 |
| 16 | 30.09 | 256.85 | 16.87 ± 0.57 | 325.0 | 328.0 | 326.5 | 30 | 1.87 |
| 17 | 30.36 | 261.41 | 16.70 ± 0.17 | 334.0 | 346.0 | 339.9 | 30 | 1.87 |

Run       Parker Print

TABLE 9-continued

Physical Test Properties

| No. | Gloss 60° | Gloss 75° | Color Hunter L* | Color Hunter A* | Color Hunter B* | Whiteness Index (%) | Roughness (micron) |
|---|---|---|---|---|---|---|---|
| 1 | 4.5 ± 0.3 | 11.2 ± 1.0 | 78.29 ± 0.5 | 0.99 ± 0.14 | 7.13 ± 0.14 | 26.72 ± 0.36 | 15.44 ± 3.19 |
| 2 | 4.8 ± 0.4 | 14.9 ± 0.3 | 80.99 ± 0.2 | 0.70 ± 0.04 | 6.40 ± 0.02 | 32.62 ± 0.18 | 15.28 ± 2.08 |
| 3 | 4.3 ± 0.3 | 11.8 ± 1.0 | 52.45 ± 0.5 | 3.17 ± 0.14 | 14.77 ± 0.14 | −6.65 ± 0.36 | 13.86 ± 1.68 |
| 4 | 5.4 ± 0.5 | 16.0 ± 4.5 | 78.85 ± 0.1 | 0.93 ± 0.06 | 7.41 ± 0.05 | 26.34 ± 0.19 | 15.01 ± 1.81 |
| 5 | 7.3 ± 0.1 | 24.3 ± 0.3 | 78.83 ± 0.1 | 1.33 ± 0.05 | 8.10 ± 0.03 | 23.75 ± 0.16 | 13.62 ± 0.13 |
| 6 | 5.9 ± 0.1 | 18.3 ± 0.3 | 78.32 ± 0.1 | 0.83 ± 0.03 | 7.55 ± 0.03 | 25.26 ± 0.13 | 15.67 ± 2.17 |
| 7 | 4.4 ± 0.1 | 11.6 ± 0.5 | 81.04 ± 0.4 | 0.91 ± 0.03 | 7.29 ± 0.07 | 28.55 ± 0.88 | 16.07 ± 0.93 |
| 8 | 4.2 ± 0.1 | 11.7 ± 0.5 | 75.30 ± 0.8 | 1.22 ± 0.10 | 8.36 ± 0.17 | 19.05 ± 0.72 | 14.86 ± 1.40 |
| 9 | 4.4 ± 0.2 | 11.9 ± 0.4 | 76.77 ± 0.4 | 1.02 ± 0.04 | 8.19 ± 0.06 | 21.21 ± 0.51 | 14.91 ± 1.83 |
| 10 | 4.1 ± 0.1 | 11.5 ± 0.3 | 72.74 ± 0.4 | 1.31 ± 0.10 | 9.17 ± 0.10 | 14.49 ± 0.49 | 15.15 ± 0.50 |
| 11 | 4.0 ± 0.1 | 11.3 ± 0.3 | 70.35 ± 0.20 | 1.43 ± 0.04 | 9.62 ± 0.09 | 11.25 ± 0.38 | 16.12 ± 1.76 |
| 12 | 4.4 ± 0 | 13.2 ± 0.4 | 68.70 ± 0.62 | 1.62 ± 0.09 | 9.72 ± 0.11 | 9.83 ± 0.72 | 14.93 ± 1.14 |
| 13 | 5.0 ± 0.1 | 15.0 ± 0.7 | 78.87 ± 0.12 | 0.64 ± 0.03 | 7.40 ± 0.03 | 26.40 ± 0.16 | 15.90 ± 1.41 |
| 14 | 6.7 ± 0.2 | 20.9 ± 0.7 | 78.95 ± 0.03 | 0.89 ± 0.04 | 6.78 ± 0.01 | 28.76 ± 0.55 | 15.75 ± 1.74 |
| 15 | 6.1 ± 0.1 | 19.0 ± 0.6 | 79.38 ± 0.03 | 0.92 ± 0.03 | 6.81 ± 0.01 | 28.83 ± 1.15 | 13.97 ± 0.33 |
| 16 | 5.6 ± 0.2 | 18.9 ± 0.6 | 71.22 ± 0.08 | −10.47 ± 0.08 | −6.36 ± 0.06 | 64.16 ± 0.61 | — |
| 17 | 6.0 ± 0.1 | 20.5 ± 0.5 | 55.98 ± 0.04 | −11.16 ± 0.03 | −28.54 ± 0.07 | 16.70 ± 0.17 | 16.09 ± 2.19 |

EXAMPLE 7

Table 10 shows the sheet process conditions employed for a commercial sheet extrusion run of several mica filled polypropylene formulations. These sheets suitably have a basis weight of about 200 to 950, per 3000 square foot ream, preferably about 200 to 400 per 3000 square foot ream. These mica filled polypropylene sheets had a mica content in the range of 25 to 35 weight percent.

Figure 26G:
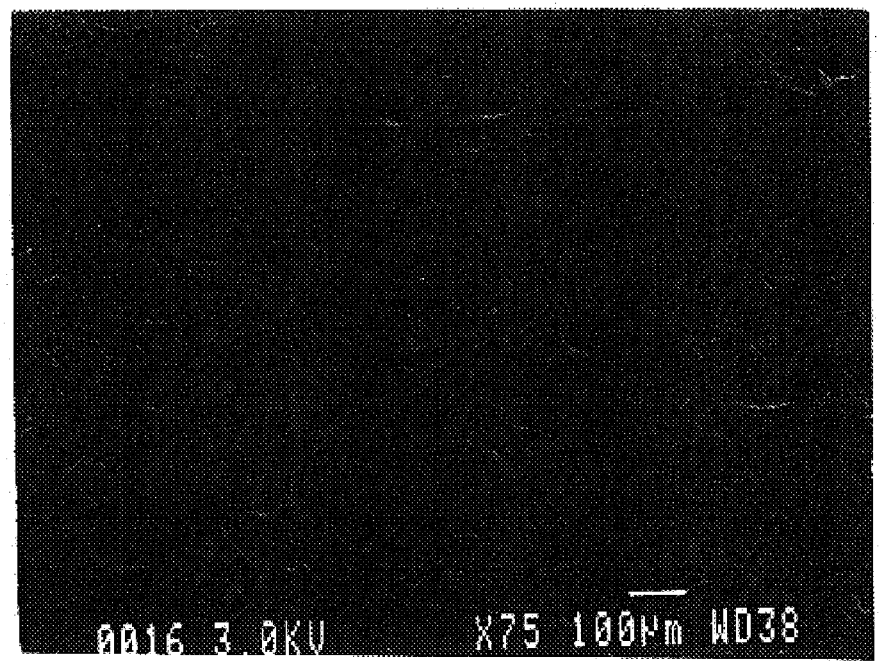
FIG. 26 is a scanning electron photomicrograph of a sheet of this invention showing two high gloss sides.
Figure 26H:
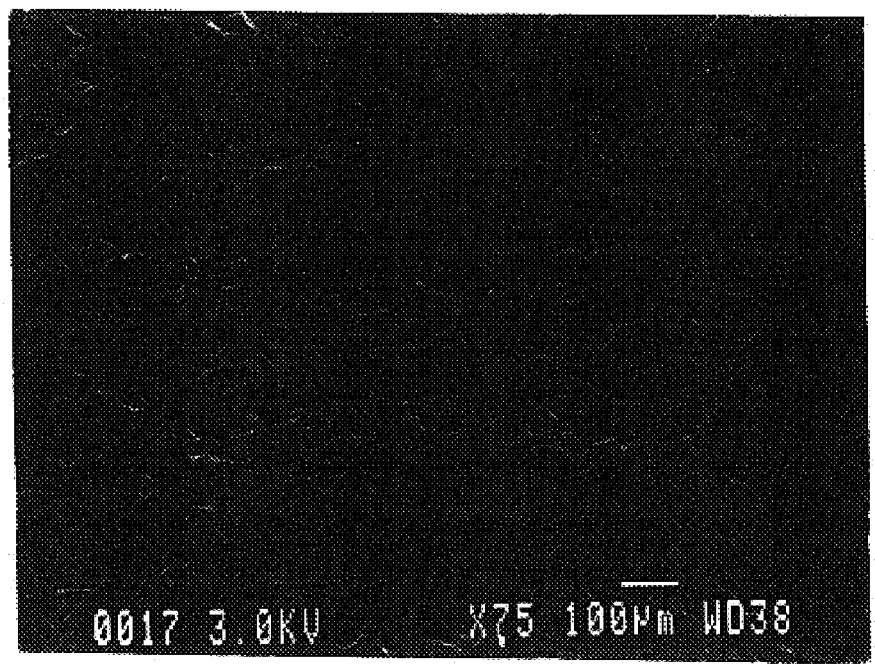

The extrusion of coupled mica and polypropylene blends was conducted on a 6" commercial extruder line. The extruder was an Egan 24/1 UD with a general purpose screw. The die was an Extrusion Die Inc. 52" coat hanger type. The stack conditioning rolls were top polished chrome, middle matte (40 RA surface), and bottom polished chrome. Extrusion conditions are set forth in Table 10. The matte chill roll assisted with the formation of the micronodular surface during thermoforming of the sheet with beneficially improving breadth of forming temperature window in contrast with non matted smooth sheets of prior art depicted in FIG. 26.

TABLE 10

Sheet Extrusion Run Conditions For Mica Filled Polypropylene

| | Run Point | | Set Point | |
|---|---|---|---|---|
| | PP/ 25% wt Mica | PP/ 30% wt Mica | PP/ 25% wt Mica | PP/ 30% wt Mica |
| Barrel Zone 1 Temp (F.) | 352 | 350 | 350 | 350 |
| Barrel Zone 2 Temp (F.) | 385 | 375 | 375 | 375 |
| Barrel Zone 3 Temp (F.) | 404 | 400 | 400 | 400 |
| Barrel Zone 4 Temp (F.) | 422 | 421 | 420 | 420 |
| Barrel Zone 5 Temp (F.) | 435 | 430 | 430 | 430 |
| Adaptor Temperature (F.) | 431 | 430 | 430 | 430 |
| Melt Temperature (F.) | 485 | 482 | — | — |
| Die Zone 1 Temp (F.) | 430 | 430 | 430 | 430 |
| Die Zone 2 Temp (F.) | 430 | 430 | 430 | 430 |
| Die Zone 3 Temp (F.) | 431 | 430 | 430 | 430 |
| Die Zone 4 Temp (F.) | 431 | 430 | 430 | 430 |
| Die Zone 5 Temp (F.) | 430 | 430 | 430 | 430 |
| Screw RPM | 55 | 54 | | |
| Drive Amperes | — | 432 | | |
| Melt Pressure (psi) | 1704 | 1705–1760* | | |
| Top Roll Temp (F.) | 132 | 133 | | |
| Middle Roll Temp (F.) | 97 | 98 | | |
| Line Speed (fpm) | 42 | 37 | | |
| Roll Gap top (mil) | 17 | 17 | | |
| Roll Gap Bottom (mil) | 21 | 21 | | |
| Die Gap (mil) | — | 19-side of die, 13-middle of die | | |
| Die-Full Width (in) | 52 | 52 | | |
| Die to Roll Distance (in) | ~6.0 | 4.5 | | |
| Full Sheet Width (in) | 50.5 | 51.5 | | |
| Trim Width (each side) (in) | 1.75 | 1.75 | | |
| Final Split Roll Width (in) | 16 | 16 | | |
| Screen Pack | 20 mesh | 20 mesh | | |
| Throughput (lb./hr.) | — | 924 | | |
| Back Pressure (psi) | 1830 | 1830 | | |
| Sheet Caliper (mil) | — | 17.3 | | |
| Roll Weight (lb.) | 400 | 430 | | |
| Roll Diameter (in) | 45 | 40 | | |
| Roll Footage (ft) | — | 6,240 | | |

*No screen pack change

Figure 25A:
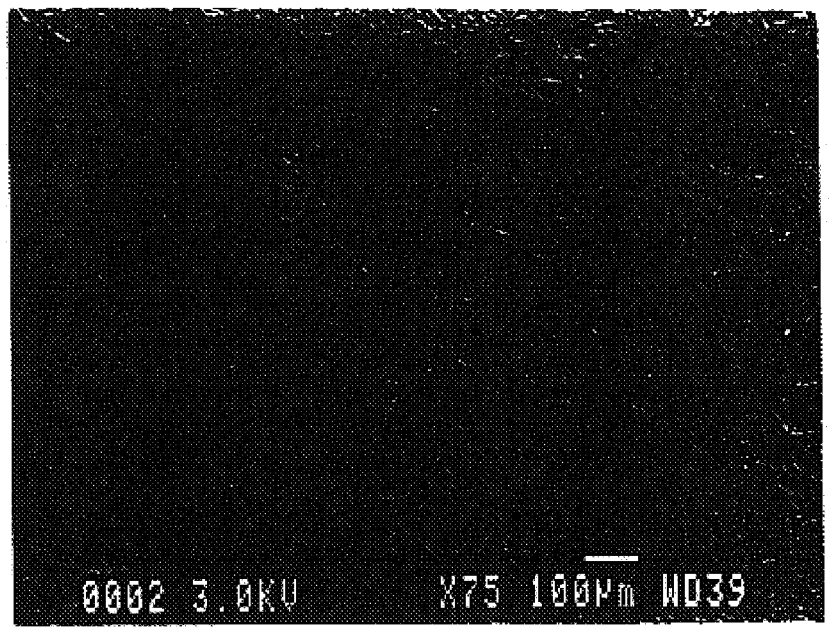
FIG. 25 is a scanning electron photomicrograph of a sheet of this invention showing a matted surface and a nonmatted surface.
Figure 25B:
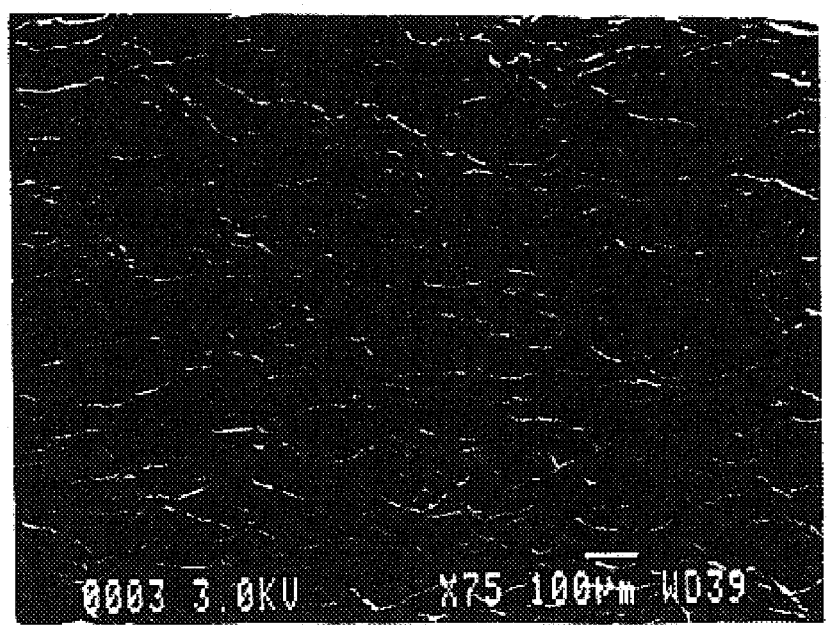

The sheets produced with conditions set forth in Table 10 were matte finished. The photomicrographs of the sheets produced according to the process of Table 10 as contrasted to those produced under conditions similar to Example 1 are set forth in photomicrographs of FIGS. 25 and 26.

TABLE 11

Roughness and Gloss Properties of PP/30% Mica Extruded Sheets and Thermoformed Plates

| Surface | Sheet Thermoforming Temperature (° F.) | Parker Roughness (microns) | Gloss (75°) |
|---|---|---|---|
| A | — | 8.56 ± 0.39 | 4.99 ± 0.14 |
| B | — | 15.82 ± 0.74 | 8.05 ± 0.30 |
| C | 305 | 13.14 ± 0.74 | 14.3 ± 1.0 |
| D | 300 | 11.74 ± 0.86 | 11.6 ± 1.0 |
| E | 292 | 12.10 ± 0.82 | 11.7 ± 1.0 |
| F | 265 | 10.63 ± 0.68 | 8.20 ± 0.6 |

TABLE 11-continued

Roughness and Gloss Properties of
PP/30% Mica Extruded Sheets and Thermoformed Plates

| Surface | Sheet Thermoforming Temperature (° F.) | Parker Roughness (microns) | Gloss (75°) |
|---|---|---|---|
| G | — | 6.17 | 82.10 |
| H | — | 5.14 | 80.75 |

(A) Matte extruded sheet having top matte side.
(B) Extruded sheet (A)-bottom side opposite to matte side
(C, D, E, F) Plate-eating side corresponding to top matte side of (A)
(G) Non-matte extruded sheet-top side (no matte roll)
(H) Non-matte extruded sheet-bottom side (no matte roll)

For a non-matte extruded sheet, usually plate gloss and plate roughness are inversely related (e.g., high gloss corresponds to low roughness and vice versa as demonstrated in prior art data generally obtained). In that case, achieving desirable micronodular texture is within a temperature range (about 295° F. to 305° F.) where above this range the forming process is sag limited while below this range the plate exhibits poor micronodular character as manifested by high gloss and low roughness.

The use of a matte roll in the chill roll stack portion of the extrusion process effectively broadens the commercially attractive thermoforming process temperature range (about 265° F. to 305° F.). Specifically, plates having acceptable surface micronodularity can be formed at lower temperatures, whereby the decrease in plate roughness is compensated by an unexpected decrease in plate gloss using sheet surface (A). This beneficial increase in plate forming temperature window from about 10° F. to about 40° F. is brought about by imparting a matte surface finish to the extruded sheet.

Thermoforming is the pressing or squeezing of pliable material into final shape. In the simplest form, thermoforming is draping of a softened sheet over a shaped mold. In the more advanced form, thermoforming is automatic, high speed positioning of a sheet having an accurately controlled temperature into a pneumatically actuated forming station.

The extruded sheet used in the suitable forming and thermoforming process, or the preferred thermoforming process as shown in FIG. 2 has a thickness of about 0.010 to 0.080 inches, suitably 0.010 to 0.030 inches, and preferably 0.015 to 0.025 inches. Suitable mica filler loading level in the extruded sheet is in the range of 25–30 weight percent, whereby mica flake aspect ratio is in the range of 30–300, more preferably 80–120, with particle size range of about 50 to 500 microns.

By matte finishing one side of the sheet using matte roll, the commercial thermoforming was suitably conducted at a broader temperature window of about 265° F. to 305° F. while without matte finishing, the thermoforming using the same commercial equipment was conducted at a temperature of about 295° F. to 305° F.

The runs on commercial equipment using PP/30% mica and PP/25% mica formulations showed that the thermoforming temperature window range has been expanded from about 10° F. (previous trial) to as high as about 35° F. This is primarily due to the fact that we beneficially used a matte roll in the chill roll stack during the extrusion process. This gave a smooth matte finish for the air side of the sheet (i.e., plate eating surface) while the rougher bottom side was in contact with the sandblasted mold side during the forming process. Use of matte sheet in turn enabled forming at lower temperatures (which is good for sag avoidance) without much loss in micronodularity. Specifically, the forming window was in the range of 265° F. to about 300° F. to 305° F. where best balance of process stability and product appearance/texture was seen at about 280° F. to 290° F.

EXAMPLE 8

FIG. 3 shows rigidity versus current plate material cost comparisons for mica filled polypropylene plates versus competitor plastic disposable plates. "J" refers to mica filled polypropylene plate of this invention and "S" refers to polystyrene based plates such as those currently manufactured by Solo Cup Company. Average plate calipers are indicated for each plate type and size. The left side of the diagram shows data for 8.75 inch plates whereby the J plate rigidity is about three times higher than S at significantly reduced caliper and cost. The right side of the diagram shows data for 10.25 inch plates whereby J plate rigidity is more than seven times higher than S at the same caliper. The open circle point corresponds to an estimated rigidity for the 10.25 inch J plate that is scaled down in caliper so that plate material costs are equivalent to S.

The scaled J caliper X is calculated as X=(19 mil)(2.9 cents/3.8 cents). The theoretical rigidity R1 at equivalent cost for the downscaled caliper is calculated as:

$$(R1/R2) = (14.5\ \text{mil}/19\ \text{mil}) \exp N$$

where R2 is the experimental rigidity at 19 mil and N=1.816 is the caliper exponent value for the Dixie Superstrong 10.25 inch plate design which is obtained from the general equation for rigidity:

$$R = (KE) T \exp N$$

where E is Young's modulus, K is a shape constant, and T is caliper. The data set forth in FIG. 3 demonstrate that the rigidity of the J plate of this invention is significantly higher at equivalent or lower material cost than commercial polystyrene polymer based plates.

EXAMPLE 9

Figure 4:
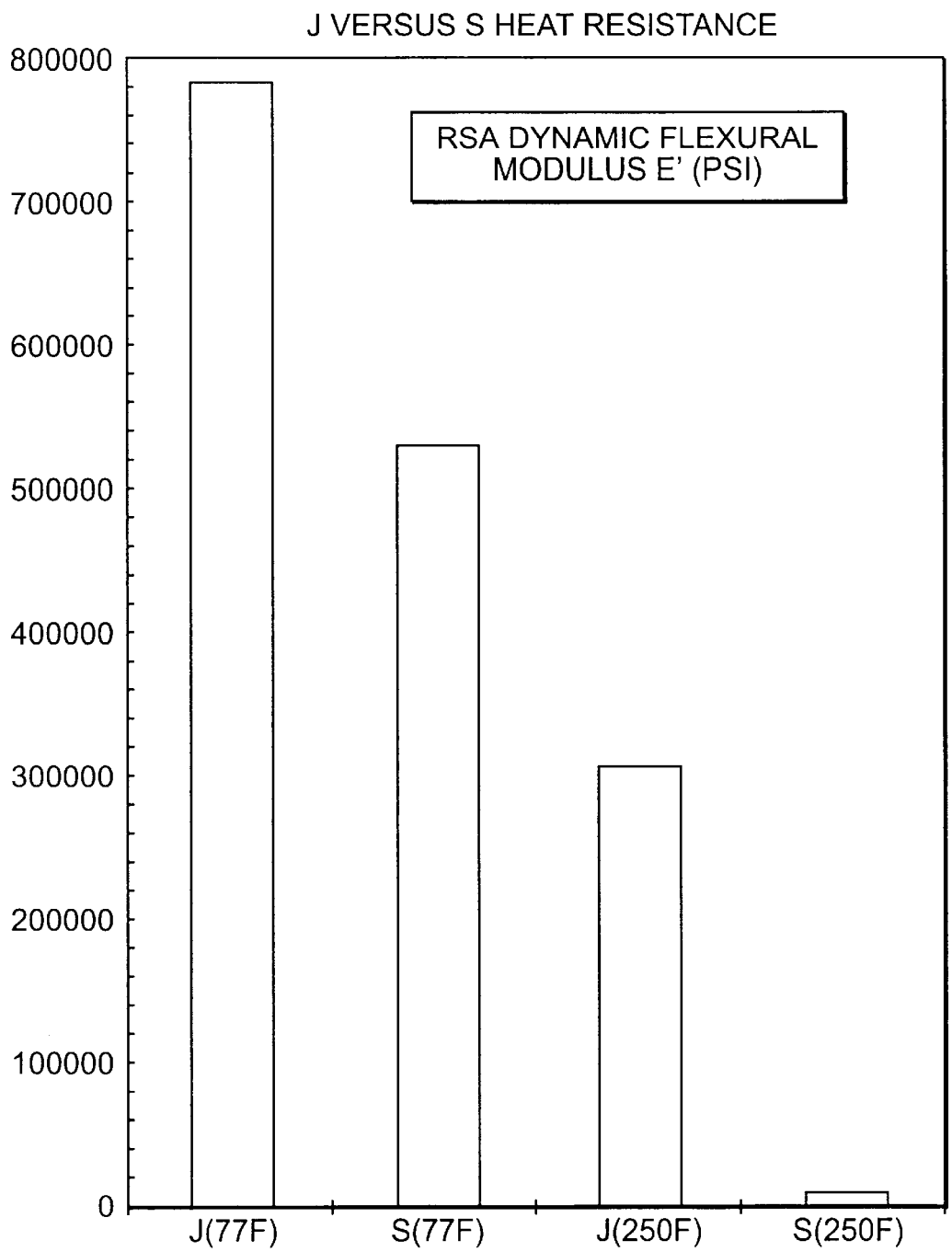
FIG. 4 is a bar graph comparing the heat resistance of the plates of this invention with prior art commercial products.

In FIG. 4, the heat resistance performance for mica filled polypropylene 10.25 in plates (J), having an average caliper of 19 mil (J) is compared with (S) polystyrene based plates (S) of the same size and caliper. A measure of heat resistance is dynamic flexural storage modulus E', as measured with the Rheometrics Solids analyzer at 10 rad/sec. Higher E' values indicate increased stiffness and improved dimensional stability. Dynamic mechanical spectroscopy is a common technique used for evaluation of viscoelastic properties of polymeric materials with respect to temperature and input frequency (deformation time scale). Dynamic mechanical properties of flat rectangular specimens of S plate material and PP/mica sheet of this invention were subjected to flexural deformation at 10 rad/sec, using the Rheometrics Solids Analyzer RSAII instrument, manufactured by Rheometric Scientific, and equipped with a dual cantilever bending fixture. Temperature scans were conducted at 0.05% strain using 2° C. temperature steps with a 0.5 minute soak time at each temperature. From the time lag between input strain delivered by the driver motor and the stress output measured by the transducer, values of material complex modulus E* are obtained. The parameter E* is formally expressed as E*=E'+iE", where E' is the storage modulus (purely elastic term) and E" is the loss modulus (purely viscous term). The storage modulus E' is defined as the stress in phase with the strain divided by the strain, which gives a measure of the energy stored and recovered per cycle. The loss modulus E" is defined as the stress 90 degrees out of phase with the strain divided by the strain, which gives a measure of the energy dissipated per cycle. The ratio of loss modulus to storage modulus is commonly known as the damping (tan delta) where delta is the phase angle between stress and strain. The dynamic storage flexural modulus E' is the operative measure of heat resistance performance, where higher values mean higher performance. At ambient conditions (77° F.), E' for mica filled polypropylene plates of this invention is appreciably higher than for S. At 25°° F., which corresponds to aggressive temperatures which are commonly encountered in the microwave heating or cooking of greasy foods, the heat resistance of J plates of this invention is significantly superior to the plates manufactured by S.

The superior heat resistance of the plates of this invention J versus the plates sold by S as characterized by E' strongly correlates with actual microwave cook test results for the two plates, as shown in Table 12. The S plate warps and loses dimensional stability with many types of foods as well as undergoes undesirable changes when coming in contact with food as evidenced by some staining and sticking. On the other hand, the J plate of this invention is a superior plate since it has excellent dimensional stability as well as excellent heat resistance when food is cooked and/or reconstituted on it.

TABLE 12

MICROWAVE COOKING TEST RESULTS FOR PLATES J AND S

| FOOD TYPE | PLATE TYPE | |
|---|---|---|
| | J | S |
| donut | pass | sugar glazing sticks |
| broccoli/cheese | pass | significantly deforms |
| pepperoni pizza | pass | moderate deformation, staining |
| barbecue pork | slight stain | significant stain/warpage |
| pancake/syrup | pass | significant warpage |
| beans & pork | pass | significant warpage |
| butter | slight warpage | significant warpage |
| bacon | moderate warpage, localized melting, no leak | significant warpage, rubbery plate flows and sticks to glass tray |

Fort James Corporation (J) plate specimens of this invention and plates manufactured by Solo Cup Company (S) were tested in the microwave (Samsung model MW 8690) with a variety of foods. The highest power setting (10) was used in all cases and cooking/heating times and procedures corresponded food manufacturer instructions on the packages. Most tested foods were of the frozen microwaveable type and were placed in a semi-thawed state directly on plates prior to cooking. When appropriate, a loose covering of wax paper was employed during the cooking process. After cooking, the plates were gently washed with warm water and inspected. The following are the detailed test results which are also summarized in Table 12.

TEST #1 RESULTS—SUGAR GLAZED DONUT

J A large, oval shaped sugar glazed plain donut was microwaved on the plate of this invention for 60 seconds. The sugar glazing melted, bubbled, and flowed on the plate. The boiling sugar and grease mixture caused the bottom of the plate to feel very warm but the plate exhibited no warping, no straining, no softening, and no soak-through. The plate was cool enough to be safely handled. The residue of the donut was easily washed off and the appearance of the used plate was excellent.

S The bottom of the plate got hot and slightly deformed with no soak-through, however, sugar stuck to the plate.

TEST #2 RESULTS—BROCCOLI WITH CHEESE SAUCE

J Green Giant 10 oz. broccoli with cheese sauce was removed from the flexible pouch and heated for five minutes in the microwave on the plate with loose covering of wax paper. The cheese melted and bubbled on the plate without sticking. The plate bottom was warm, but no soak-through and no loss of dimensional stability was observed. After washing, no staining was observed and the appearance of the used plate was excellent.

S The plate bottom got hot and significantly deformed with no soak-through.

TEST #3 RESULTS—PEPPERONI PIZZA

J Tombstone 7 oz. Pepperoni pizza was cooked on an uncovered plate for 4 minutes. The cheese melted and started bubbling about halfway through the test. The molten cheese mingled with the hot liquid fat exuded from the pepperoni and dripped on the sides of the crust onto the plate. No sticking, no soak-through, no staining, and no loss in plate dimensional stability was observed and the appearance of the used plate was excellent.

S The plate bottom got hot and moderately deformed with no soak-through. The greasy reddish stain from oil in pepperoni could not be completely washed off.

TEST #4 RESULTS—MICROWAVE KID MEAL

Pork Rib Patties, Barbecue Sauce, Fries, Honey Corn Bread

J A quick meal preparation simulation test was conducted using a Swanson 7.2 oz. microwave kids' meal with ingredients consisting of partially cooked boneless pork rib patties, barbecue sauce, fries, and honey corn bread. The food was transferred from the compartmented tray onto the plate. Sauce was spooned on top of the pork meat and was allowed to drip on the sides of the patties and onto the plate. The cornbread batter was spooned out and was placed on the plate next to the fries. The food was loosely covered with wax paper and cooked for 3.5 minutes. Examination after microwaving showed that the cornbread was fully cooked and there was no sticking or damage to the plate. The fries and pork meat with sauce caused no soak-through and no loss in plate dimensional stability. Washing of plate revealed the presence of slight staining from barbecue sauce. Overall, the appearance of the used plate was very good.

S The plate bottom deformed mainly from pork meat with considerable staining from the barbecue sauce without soak-through.

TEST #5 RESULTS—BEANS WITH PORK AND TOMATO SAUCE

J Beans with pork and tomato sauce (8 oz can) were placed on the plate, covered with wax paper and heated for 2 minutes to near boiling. The bottom of plate got hot, but the rim was cool to touch. The hot plate bottom exhibited no bulging and also, when the hot food plate was handled by the rim there was no perceived loss in dimensional stability. No soak-through, no warping, and no staining was observed. The appearance of the plate was excellent.

S The plate bottom became very hot and severely deformed with no soak-through and when handled by the rim, the plate felt like it had low rigidity.

TEST #6 RESULTS—PANCAKES WITH SYRUP AND PRECOOKED BACON

J In this test, Swanson microwave pancakes and bacon breakfast (4.5 oz. size) were used. The semi-thawed meal consisted of three pancakes and three partially precooked bacon strips. The pancakes and bacon were removed from the tray in carton and placed on plate. Approximately 5 teaspoons of pancake syrup was spooned over the pancakes and the assembled meal was covered with wax paper and microwaved for 2 minutes. Although the bottom of the plate got hot, the overall plate performance was excellent, i.e. no warpage, no soak-through, no loss in dimensional stability, and no staining. Some hot grease was exuded by the bacon during crisping but there was no observed damage to the plate. The appearance of the used plate was excellent.

S The plate bottom became hot and significantly deformed (especially in areas where bacon was placed), but no soak-through was observed and when handled by the rim, the plate felt soft.

TEST #7 RESULTS—BUTTER

J Butter (5 tsp. chunk) was placed the on plate and was loosely covered with wax paper and was microwaved for 3 minutes. The butter melted completely and covered the whole plate bottom. The butter began boiling toward the end of the test. The plate bottom got very hot and became slightly warped but no soak-through. The rim of the plate felt cool to touch enabling safe removal of the plate from the microwave oven. A small portion of the butter became charred but was easily washed off the plate. Overall plate performance was good.

S The plate bottom became very hot and was significantly warped but no soak-through was observed and the greasy film residue could not be washed off completely. Plate felt soft and rubbery when handled by the rim.

TEST #8 RESULTS—Bacon

J Three strips of raw, cured bacon were wrapped in three sheets of paper towel and cooked for 5 min. All of the bacon became crispy and about 20% of it was charred. The bottom of plate got very hot but most of rim area was relatively cool to touch. Grease exuded from bacon and soaked through the towel. The grease pooled on the plate bottom, side and on some rim areas. The grease which pooled in some rim regions caused localized melting of the plate but no holes were formed. The hot grease which pooled on plate bottom caused significant warpage but no soak-through. Overall plate performance for Test #8 was less satisfactory than Test #7.

S When the raw bacon was wrapped in paper toweling and cooked on the S plate, the bottom became very soft and stuck to the glass tray in the microwave. Under such hot grease conditions, the adhering polymer regions underwent localized melting and stretched when the plate was lifted off the glass tray. The plate was severely warped but no holes formed and no soak-through was noticed.

With the possible exception of raw bacon, the behavior of the J plate of this invention in the microwave oven is considered excellent with a variety of aqueous, greasy/fatty, sugary food combinations. No unusual or off odors were detected during and after cooking for each type of food directly on the plate. The foregoing data demonstrates the superior properties of the plates of this invention.

We claim:

1. A process for forming a microwaveable, food contact compatible, disposable, rigid and strong, mica-filled polyolefin container wherein the polyolefin is chosen from at least one of polypropylene and polypropylene polyethylene copolymer or blend, comprising the steps of:
    (a) forming an extrudable admixture of the polyolefin resin and mica;
    (b) extruding said extrudable admixture of the polyolefin resin and mica at elevated temperature;
    (c) passing the resulting extruded admixture of the polyolefin resin and mica through a multiple roll stack of rolls, at least one roll of said stack having a matte finish;
    (d) passing said extruded admixture of the polyolefin resin and mica at least partially around said roll having a matte finish;
    (e) controlling the speed of said extrusion process, the size, temperature and configuration of said roll stack such that the surface of said extruded admixture of the polyolefin resin and mica in contact with said matte roll has a matted structure;
    (f) thermoforming said extruded admixture of the polyolefin resin, and mica; and
    (g) recovering a container having a micronodular surface and a coarse surface.

2. The process of claim 1 wherein the container is a plate.

3. A process for forming a microwaveable, food contact compatible, disposable, rigid and strong, mica-filled polyolefin container selected from the group consisting of polypropylene and polypropylene polyethylene copolymer or blend, and a mixture of these comprising the steps of:
    (a) forming an extrudable admixture of the polyolefin resin and mica;
    (b) extruding said extrudable admixture of the polyolefin resin and mica at elevated temperature;
    (c) passing the resulting extruded admixture of the polyolefin resin and mica through a multiple roll stack of rolls, at least one roll of said stack having a matte finish;
    (d) passing said extruded admixture of the polyolefin resin and mica at least partially around said roll having a matte finish;
    (e) controlling the speed of said extrusion process, the size, temperature and configuration of said roll stack such that the surface of said extruded admixture of the polyolefin resin and mica not in contact with said matte roll has a coarse-grained structure;
    (f) thermoforming said extruded admixture of the polyolefin resin, and mica; and
    (g) recovering a container having a micronodular surface and a rough surface and exhibiting a melting point of no less than 250° F., said container being dimensionally stable and resistant to grease, sugar, and water at temperatures up to about 220° F. and having sufficient toughness to be resistant to cutting by serrated flatware.

4. The process of claim 3 wherein the coarse-grained structure of the surface of said extruded admixture of the polyolefin resin and mica not in contact with said matte roll is formed by transversing the extruded admixture of the polyolefin resin and mica through a curvilinear path and at least partially solidifying the surface of said extruded admixture of polyolefin resin and mica not contacting said matte roll while that surface is in tension relative to the surface contacting said matte roll.

5. The process of claim 3 wherein the container is a plate.

6. The process of claim 3 wherein the container is a cup.

7. The process of claim 3 wherein the container is a bowl.

8. The process of claim 3 wherein the container is a tray.

9. The process of claim 3 wherein the container is a bucket.

10. The process of claim 3 wherein the container is a soufflé dish.

11. The process of claim 1 or 3 wherein the thermoforming is conducted at a temperature of about 260° F. to 310° F.

12. The process of claim 11 wherein the thermoforming is conducted at a temperature of about 270° F. to 290° F.

13. A process for forming a mica-filled polyolefin extruded sheet wherein the polyolefin is chosen from at least one of polypropylene and polypropylene polyethylene copolymer or blend, comprising the steps of:
 (a) forming an extrudable admixture of the polyolefin resin and mica;
 (b) extruding said extrudable admixture of the polyolefin resin and mica at elevated temperature;
 (c) passing the resulting extruded admixture of the polyolefin resin and mica through a multiple roll stack, at least one roll of said roll stack having a matte finish;
 (d) passing said extruded admixture of the polyolefin resin and mica at least partially around said roll having a matte finish;
 (e) controlling the speed of said extrusion process, the size, temperature, and configuration of said roll stack such that the surface of said extruded admixture of the polyolefin resin and mica not in contact with said matte roll has a coarse-grained structure; and
 (f) recovering a sheet comprising polyolefin and mica moieties, said sheet having a matted surface and a rough surface.

14. The process of claim 13 wherein the coarse-grained structure of the surface of said extruded admixture of the polyolefin resin and mica not in contact with said matte roll is formed by traversing the extruded admixture of the polyolefin resin and mica through a curvilinear path and at least partially solidifying the surface of said extruded admixture of polyolefin resin and mica not contacting said matte roll while that surface is in tension relative to the surface contacting said matte roll.

15. A process for the manufacture of a microwaveable, food contact compatible, disposable, rigid and strong extruded sheet consisting essentially of an admixture of polyolefin, mica, and pigment thermoformed by application of vacuum into the shape of a container; wherein said polyolefin is chosen from at least one of polypropylene and polypropylene polyethylene copolymer or blend; said sheet exhibiting a softening point of no less than about 250° F.; said sheet being dimensionally stable and resistant to grease, sugar, and water at temperatures of about 220° F. and of sufficient toughness to be resistant to cutting by serrated polystyrene flatware; said sheet being capable of forming a micronodular surface on one side when subjected to vacuum forming comprising:
 mixing the polyolefin selected from the group consisting of polypropylene, polypropylene polyethylene copolymer or blend, and mixtures of these, mica, coupling agent, and pigment; and
 converting the mixture at a temperature of about 380° F. to 480° F. into a sheet and recovering the sheet having a caliper in the range of about 5 to 50 mils.

16. A process for the manufacture of a microwaveable, food contact compatible, disposable, rigid and strong container comprising an extruded sheet consisting essentially of an admixture of polyolefin, mica and pigment thermoformed by application of vacuum into the shape of a container; wherein said polyolefin is chosen from at least one of polypropylene and polypropylene polyethylene copolymer or blend; said container further exhibiting:
 (a) a micronodular surface on at least one side of the container surface; and
 (b) a melting point of no less than about 250° F.; said container being dimensionally stable and resistant to grease, sugar, and water at temperatures up to about 220° F. and of sufficient toughness to be resistant to cutting by serrated polystyrene flatware comprising;
 (a) heat softening an extruded sheet consisting essentially of an admixture of polyolefin selected from the group consisting of polypropylene, polypropylene polyethylene copolymer or blend, and mixture of these, mica, and pigment; and
 (b) vacuum forming the container in a mold controlled to form a micronodular surface of the container not in contact with the mold surface.

17. The process of claim 16 wherein the heat softening of the sheet is conducted at a temperature of at least 330° F.

18. A process for the manufacture of a microwaveable, food contact compatible, disposable, rigid and strong plate comprising an extruded sheet consisting essentially of an admixture of polypropylene or polypropylene polyethylene copolymer or blend, mica, and pigment, formed, thermoformed, or thermoformed by application of vacuum into the shape of a plate; said plate exhibiting:
 (a) a micronodular surface on at least one side;
 (b) a melting point of no less than about 250° F.; and
 (c) thickness uniformity characterized by a thickness coefficient variation of less than five percent; said plate being dimensionally stable and resistant to grease, sugar, and water at temperatures up to at least 220° F. and of sufficient toughness to be resistant to cutting by serrated polystyrene flatware comprising:
 heat softening an extruded sheet consisting essentially of an admixture of polyolefin selected from the group consisting of polypropylene, polypropylene polyethylene copolymer or blend, and mixtures of these, mica, and pigment; and
 vacuum forming the plate in a mold controlled to form a micronodular surface of the plate not in contact with the mold surface.

19. A process for the manufacture of a microwaveable, food contact compatible, disposable, rigid and strong extruded sheet consisting essentially of an admixture of polyolefin, mica, and pigment thermoformed by application of vacuum into the shape of a container; wherein said polyolefin is chosen from at least one of polypropylene and polypropylene polyethylene copolymer or blend; said sheet exhibiting a softening point of no less than about 250° F.; said sheet being dimensionally stable and resistant to grease, sugar, and water at temperatures of about 220° F. and of sufficient toughness to be resistant to cutting by serrated polystyrene flatware; said sheet being capable of forming a micronodular surface on one side when subjected to vacuum forming comprising:
 mixing the polyolefin selected from the group consisting of polypropylene, polypropylene polyethylene copolymer or blend, and mixtures of these, mica, coupling agent, and pigment;
 converting the mixture at a temperature of about 380° F. to 480° F. into a sheet,
 matting the sheet on one side, and
 recovering the sheet having a caliper in the range of about 5 to 50 mils and exhibiting a matted surface on one side.

20. The process of claim 19 wherein the heat softening of the sheet is conducted at a temperature of at least 330° F.

21. A process for the manufacture of a microwaveable, food contact compatible, disposable, rigid and strong container comprising an extruded sheet consisting essentially of an admixture of polyolefin, mica and pigment thermoformed by application of vacuum into the shape of a container; wherein said polyolefin is chosen from at least one of polypropylene and polypropylene polyethylene copolymer or blend; said container further exhibiting:

(a) a micronodular surface on at least one side of the container surface; and (b) a melting point of no less than about 250° F.; said container being dimensionally stable and resistant to grease, sugar, and water at temperatures up to about 220° F. and of sufficient toughness to be resistant to cutting by serrated polystyrene flatware comprising:

heat softening an extruded sheet consisting essentially of an admixture of polyolefin, mica, and pigment wherein said polyolefin is chosen from at least one of polypropylene and polypropylene polyethylene copolymer or blend; and vacuum forming the container in a mold controlled to form a micronodular surface of the container not in contact with the mold surface.

* * * * *

UNITED STATES PATENT AND TRADEMARK OFFICE
CERTIFICATE OF CORRECTION

PATENT NO. : 6,719,943 B1
DATED : April 13, 2004
INVENTOR(S) : Cristian M. Neculescu et al.

It is certified that error appears in the above-identified patent and that said Letters Patent is hereby corrected as shown below:

Title page,
Item [57], ABSTRACT,
Line 8, "of a the aforementioned" should read -- of the aforementioned --.

Column 31,
Line 2, "soufllé" should read -- soufflé --.

Column 32,
Line 7, "comprising;" should read -- comprising: --.

Signed and Sealed this

Eighth Day of June, 2004

JON W. DUDAS
*Acting Director of the United States Patent and Trademark Office*